United States Patent
Huang

(10) Patent No.: US 11,012,489 B2
(45) Date of Patent: May 18, 2021

(54) PICTURE FILE PROCESSING METHOD, PICTURE FILE PROCESSING DEVICE, AND STORAGE MEDIUM

(71) Applicant: TENCENT TECHNOLOGY (SHENZHEN) COMPANY LIMITED, Shenzhen (CN)

(72) Inventor: Xiaozheng Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 24 days.

(21) Appl. No.: 16/362,133

(22) Filed: Mar. 22, 2019

(65) Prior Publication Data
US 2019/0222623 A1    Jul. 18, 2019

Related U.S. Application Data

(63) Continuation of application No. PCT/CN2018/079541, filed on Mar. 20, 2018.

(30) Foreign Application Priority Data

Apr. 8, 2017 (CN) .......................... 201710225905.2

(51) Int. Cl.
*H04N 19/172* (2014.01)
*H04N 19/186* (2014.01)
(Continued)

(52) U.S. Cl.
CPC ......... *H04L 65/607* (2013.01); *H04N 19/172* (2014.11); *H04N 19/186* (2014.11);
(Continued)

(58) Field of Classification Search
None
See application file for complete search history.

(56) References Cited

U.S. PATENT DOCUMENTS 5,627,590 A * 5/1997 Hamano .............. H04N 21/236
   375/240.02
5,969,764 A * 10/1999 Sun ...................... H04N 19/176
   375/240.06
(Continued)

FOREIGN PATENT DOCUMENTS

CN    101742317 A    6/2010
CN    102036059 A    4/2011
(Continued)

OTHER PUBLICATIONS

Search report IP.Com.*
(Continued)

*Primary Examiner* — Mohammad J Rahman
(74) *Attorney, Agent, or Firm* — Anova Law Group, PLLC

(57) ABSTRACT

A picture file processing method is provided. The method includes determining, by a computing device, during a process of encoding transparency data of a picture, transparency input values according to the transparency data of the picture. The method also includes encoding, by the computing device using a video encoder, the transparency input values as data of a preset target channel of the video encoder, to obtain transparency stream data of the picture; and encoding color data of the picture, to obtain color stream data of the picture. The method also includes outputting, by the computing device, compressed image data of the picture. The compressed image data includes the transparency stream data of the picture and the color stream data of the picture.

18 Claims, 11 Drawing Sheets

(51) Int. Cl.
*H04N 19/467* (2014.01)
*H04N 21/234* (2011.01)
*H04N 21/235* (2011.01)
*H04N 21/2365* (2011.01)
*H04L 29/06* (2006.01)

(52) U.S. Cl.
CPC ......... *H04N 19/467* (2014.11); *H04N 21/234* (2013.01); *H04N 21/235* (2013.01); *H04N 21/2365* (2013.01); *H04L 69/22* (2013.01)

(56) References Cited

U.S. PATENT DOCUMENTS

| | | | | |
|---|---|---|---|---|
| 5,974,172 | A * | 10/1999 | Chen | H04N 9/75 348/E9.056 |
| 6,023,296 | A * | 2/2000 | Lee | H04N 19/172 375/240.05 |
| 6,404,814 | B1 * | 6/2002 | Apostolopoulos | H04N 19/20 375/240.08 |
| 6,704,431 | B1 * | 3/2004 | Ogawa | G06T 1/0028 375/E7.089 |
| 6,956,960 | B2 * | 10/2005 | Kondo | G06T 7/223 382/107 |
| 6,959,117 | B2 * | 10/2005 | Ratner | G06T 9/00 375/E7.081 |
| 8,014,027 | B1 * | 9/2011 | Kulkarni | H04N 1/6058 358/1.9 |
| 8,136,100 | B1 * | 3/2012 | Goldman | G06F 8/61 717/120 |
| 8,698,840 | B2 * | 4/2014 | Yeh | H04N 21/8146 345/629 |
| 2003/0093817 | A1 * | 5/2003 | Lee | H04N 21/43637 725/151 |
| 2003/0195998 | A1 * | 10/2003 | Estrop | G06F 13/38 719/323 |
| 2004/0229656 | A1 * | 11/2004 | Takahashi | G06F 3/14 455/566 |
| 2005/0060421 | A1 * | 3/2005 | Musunuri | H04N 19/61 709/231 |
| 2005/0265614 | A1 * | 12/2005 | Seong | G06T 9/001 382/239 |
| 2006/0031915 | A1 * | 2/2006 | Winder | H04N 21/4347 725/135 |
| 2007/0016081 | A1 * | 1/2007 | Harris | A61B 5/0075 600/476 |
| 2007/0086515 | A1 * | 4/2007 | Kirkenko | H04N 19/61 375/240.1 |
| 2008/0013623 | A1 * | 1/2008 | Wang | H04N 21/64792 375/240.1 |
| 2008/0107169 | A1 * | 5/2008 | Roman | H04N 19/59 375/240 |
| 2008/0247641 | A1 * | 10/2008 | Rasmusson | G06T 11/40 382/166 |
| 2009/0060356 | A1 | 3/2009 | Maynard et al. | |
| 2009/0189972 | A1 * | 7/2009 | Harris | A61B 5/0059 348/14.08 |
| 2009/0285478 | A1 * | 11/2009 | Thiebaud | H04N 1/6058 382/166 |
| 2011/0110600 | A1 * | 5/2011 | Niemi | H04N 19/176 382/248 |
| 2011/0249720 | A1 * | 10/2011 | Wasily | H04N 19/60 375/240.2 |
| 2012/0044322 | A1 * | 2/2012 | Tian | H04N 19/597 348/43 |
| 2012/0275525 | A1 | 11/2012 | Uro | |
| 2013/0047074 | A1 * | 2/2013 | Vestergaard | H04N 21/8543 715/234 |
| 2014/0072027 | A1 * | 3/2014 | Li | H04N 19/15 375/240.01 |
| 2014/0126814 | A1 | 5/2014 | Christensen et al. | |
| 2015/0117518 | A1 * | 4/2015 | Rondao Alface | G06T 9/001 375/240.02 |
| 2015/0128074 | A1 * | 5/2015 | De Angelis | G06F 3/04845 715/763 |
| 2015/0195544 | A1 * | 7/2015 | Dev | H04N 19/136 375/240.26 |
| 2016/0309059 | A1 * | 10/2016 | Tourapis | H04N 1/6005 |
| 2017/0134731 | A1 * | 5/2017 | Tourapis | H04N 1/646 |
| 2017/0229052 | A1 * | 8/2017 | Veernapu | G09G 5/001 |
| 2018/0054630 | A1 * | 2/2018 | Chang | G06T 9/005 |
| 2018/0234116 | A1 * | 8/2018 | Shi | H04L 1/007 |

FOREIGN PATENT DOCUMENTS

| | | |
|---|---|---|
| CN | 101742317 B | 3/2012 |
| CN | 102821279 A | 12/2012 |
| CN | 103238178 A | 8/2013 |
| CN | 107071514 A | 8/2017 |
| EP | 1571850 A2 | 9/2005 |

OTHER PUBLICATIONS

Machine level translation Zhenyu et al., CN 101742317 A.*
M. Naccari and M. Mrak, "Binary alpha channel compression for coding of supplementary video streams," 2013 IEEE 15th International Workshop on Multimedia Signal Processing (MMSP), Pula, Italy, 2013, pp. 200-205, doi: 10.1109/MMSP.2013.6659288.*
The World Intellectual Property Organization (WIPO) International Search Report for PCT/CN2018/079541 dated Jun. 15, 2018 5 Pages (including translation).
The State Intellectual Property Office of the People's Republic of China (SIPO) Office Action 1 for 201710225905.2 dated Feb. 2, 2018 12 Pages (including translation).
The State Intellectual Property Office of the People's Republic of China (SIPO) Office Action 2 for 201710225905.2 May 18, 2018 13 Pages (including translation).
Taiwan Intellectual Property Office (TIPO) Office Action 1 for 107111912 dated May 7, 2019 12 Pages (including translation).

* cited by examiner

US 11,012,489 B2

PICTURE FILE PROCESSING METHOD, PICTURE FILE PROCESSING DEVICE, AND STORAGE MEDIUM

RELATED APPLICATIONS

This application is a continuation application of PCT Patent Application No. PCT/CN2018/079541, filed on Mar. 20, 2018, which claims priority to Chinese Patent Application No. 201710225905.2, entitled "PICTURE FILE PROCESSING METHOD AND INTELLIGENT TERMINAL" filed with the Patent Office of China on Apr. 8, 2017, the entire contents of both of which are incorporated herein by reference.

FIELD OF TECHNOLOGY

This application relates to the field of image processing technologies, and in particular, to a picture file processing method, a picture file processing device, and a storage medium.

BACKGROUND OF THE DISCLOSURE

With development of the mobile Internet, downloading traffic of a terminal device is greatly increased, and among downloading traffic of a user, picture traffic occupies a large proportion. A large quantity of pictures also cause a large pressure on network transmission bandwidth load. If a size of a picture can be reduced, not only a loading speed can be improved, but also a large quantity of bandwidth and storage costs can be saved.

SUMMARY

An embodiment of this application provides a picture file processing method. The method includes determining, by a computing device, during a process of encoding transparency data of a picture, transparency input values according to the transparency data of the picture. The method also includes encoding, by the computing device using a video encoder, the transparency input values as data of a preset target channel of the video encoder, to obtain transparency stream data of the picture; and encoding color data of the picture, to obtain color stream data of the picture. The method also includes outputting, by the computing device, compressed image data of the picture. The compressed image data includes the transparency stream data of the picture and the color stream data of the picture.

An embodiment of this application further provides a picture file processing device, including one or more processors and one or more memories. The one or more processors are configured to determine during a process of encoding transparency data of a picture, transparency input values according to the transparency data of the picture. The one or more processors are also configured to encode, using a video encoder, the transparency input values as data of a preset target channel of the video encoder, to obtain transparency stream data of the picture; and encode color data of the picture, to obtain color stream data of the picture. The one or more processors are also configured to output compressed image data of the picture. The compressed image data includes the transparency stream data of the picture and the color stream data of the picture.

An embodiment of this application further provides a non-transitory computer readable storage medium that stores computer readable instructions. The computer readable instructions cause at least one processor to determine during a process of encoding transparency data of a picture, transparency input values according to the transparency data of the picture. The computer readable instructions also cause the at least one processor to encode, using a video encoder, the transparency input values as data of a preset target channel of the video encoder, to obtain transparency stream data of the picture; and encode color data of the picture, to obtain color stream data of the picture. The computer readable instructions also cause the at least one processor to output compressed image data of the picture. The compressed image data includes the transparency stream data of the picture and the color stream data of the picture.

Use of the foregoing solutions provided in this application can improve picture compression efficiency, and save encoding/decoding time.

DESCRIPTION OF EMBODIMENTS

Figure 1:
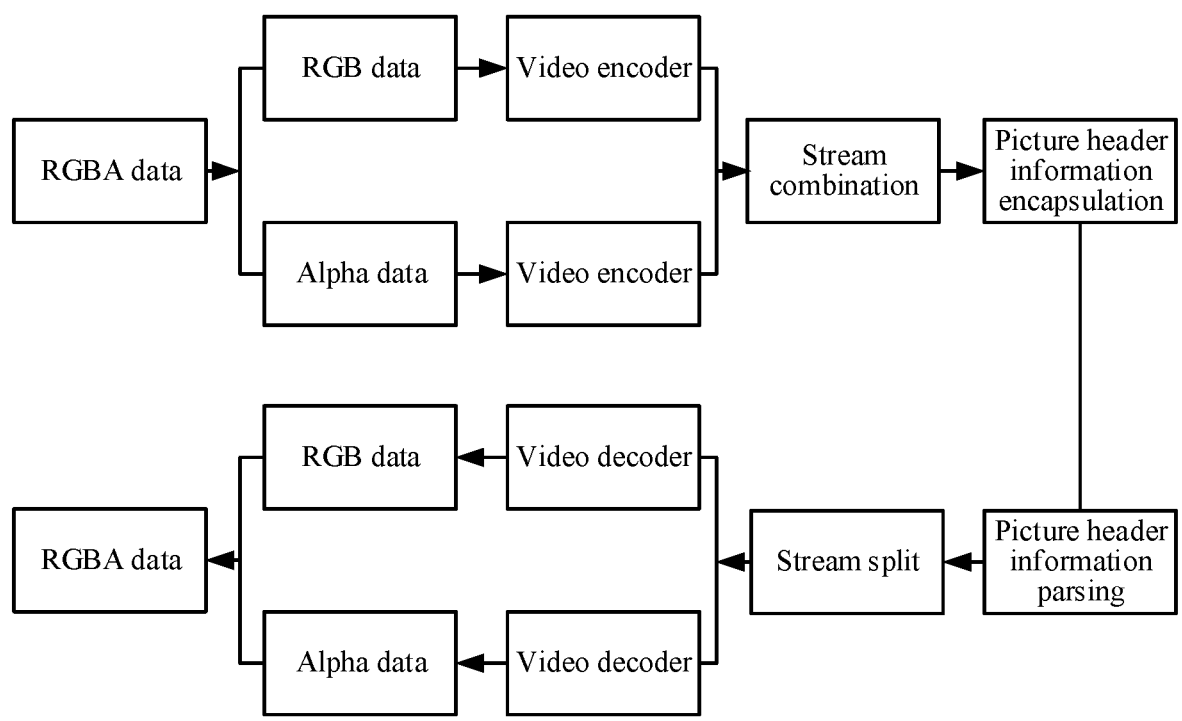
FIG. 1 is a schematic block diagram of picture encoding/decoding compression according to an embodiment of this application.

In some examples, a size of a picture is reduced in two manners. One manner is to reduce picture quality. For example, quality of a Joint Photographic Experts Group (jpeg) picture is reduced from jpeg80 to jpeg70 or even lower. In this way, although bandwidth can be saved, picture quality is also greatly decreased, and user experience is affected. The other manner is to use a more efficient picture compression method, to compress a picture smaller while ensuring picture quality. Current mainstream picture compression formats include jpeg, Portable Network Graphic Format (png), Graphics Interchange Format (gif), and the like. Encoding compression performed by using these picture compression methods has respective characteristics.

Alpha data, also referred to as transparency data, is used as a component of a pixel of some pictures, and represents a transparency of the pixel on which the Alpha data is located. When a transparency value represents fully transparent, a background placed at a lower layer of a picture is completely displayed. When a transparency represents completely opaque, a picture completely covers a background at a lower layer, and the picture is completely displayed. When a transparency represents translucent, according to a transparency value, a picture and a background placed under the picture are weighted and displayed.

Currently, when encoding compression is performed on a picture including transparency data, obtained compressed image data is relatively large, which is not favorable to storage and transmission of the picture. For example, if Alpha data (transparency data) is encoded with WebP encoding (i.e., an existing lossless coding method) during the image compression process, a large image data is produced. Another existing approach is encoding the Alpha data (transparency data) using cluster quantization (i.e., an existing loss coding method). Although the file size is reduced, cluster quantization produces distortions such as ripple effect, which has poor subjective effect and undermines user experience.

To resolve the foregoing technical problem, in this application, when encoding compression is performed on a picture, the picture is compressed by using a video encoding compression method, and the picture including Alpha data is encoded/decoded by using a video encoder and a video decoder. The video encoder may encode the Alpha data of the picture through lossy encoding or lossless encoding.

The video encoder usually includes a Y channel, a U channel and a V channel, and the video encoder completes encoding compression on a video frame based on these three channels. Y is a luminance signal, indicating a brightness, that is, a grayscale value, and U and V are two color difference signals, whose functions are to describe an image color and a saturation, used to designate a color of a pixel. In an embodiment of this application, the Alpha data of the picture may be encoded by using the Y channel of the video encoder. In another embodiment, the Alpha data of the picture may alternatively be encoded based on the U channel or the V channel of the video encoder.

In an embodiment of this application, a picture on which encoding compression is to be performed may be first parsed, to obtain RGBA (Red, Green, Blue, Alpha) data. RGB data is color data of the picture. The RGB data may be converted into YUV data, then the YUV data and Alpha data are respectively encoded based on the video encoder, and stream data on which encoding is complete is combined so as to obtain compressed image data of the picture. When the picture needs to be obtained through decoding, the YUV data and the Alpha data in the compressed image data of the picture are respectively obtained through decoding based on the video decoder. The YUV data is first converted into the RGB data, and then the RGB data obtained through conversion and the Alpha data are combined into the RGBA data, so as to restore the picture through decoding.

That the Alpha data is binary data means that a value corresponding to the Alpha data can include only 0 or 1. For example, an Alpha value of some pictures includes only 1 or 0, correspondingly representing completely opaque or completely transparent. A quantity of values of the Alpha data may alternatively be more than two. A value corresponding to the Alpha data is usually 8 bits, and magnitude of the value is between 0 and 255.

In an embodiment of this application, the Alpha data of the picture is encoded by using the Y channel of the video encoder, and the Alpha data may be encoded in a lossy compression manner of the video encoder. Inputs of the video encoder are usually three channels, namely, a Y channel, a U channel and a V channel. Therefore, when the Alpha data is encoded, the Alpha data is only encoded as Y-channel data, and the U channel and the V channel may skip an encoding/decoding process (e.g., by assigning constant values as U-channel data and V-channel data during encoding, and by skipping using/processing U-channel data and V-channel data during decoding). Additionally, when the Alpha data is binary data, the Alpha data further needs to be specially processed when the Alpha data is input to the video encoder as the Y-channel data. In another embodiment, the video encoder may alternatively encode the Alpha data in a lossless compression manner.

In an embodiment of this application, encoder side: an input of the encoder side is source image RGBA data, and an output of the encoder side is compressed image data. For the input RGBA data, the RGBA data is first separated into RGB data and Alpha data. The RGB data is first converted into YUV data (if lossless encoding is used, the RGB data is directly encoded), then the YUV data is sent to the video encoder for encoding to obtain RGB stream data (which may also be referred to as an image frame stream), and then the Alpha data is considered as Y data and is encoded in a form of YUV 4:0:0 or YUV 4:2:0 (UV is a constant) to obtain transparency stream data (which may also be referred to as a transparent channel frame stream); and respective encoding is completed, the image frame stream and the transparent channel frame stream are combined, and a compressed stream is output after picture format encapsulation is completed. The compressed stream may be considered as the compressed image data of the picture.

Decoder side: an input of a decoder is image stream data (that is, the compressed image data output by the foregoing encoder side), and an output of the decoder is RGBA data. After obtaining the image stream data, the decoder first parses picture header information data, to obtain basic feature information of the picture; and then sequentially decodes all frames of image frame data, to output YUV data, then converts the YUV data into RGB data, continues to perform decoding to output YUV' data, where Y' channel data output by the decoder is Alpha data, and combines the Alpha data and the foregoing RGB data to output the RGBA data.

Specifically, a schematic block diagram of picture encoding/decoding compression according to an embodiment of this application is shown in FIG. 1. On an encoder side, a picture in such a format as jpeg/png may be first decoded to generate RGBA data. Then, RGB data and Alpha data are separated. The RGB data is converted into YUV data that is respectively encoded in a video encoder based on a Y channel, a U channel and a V channel. Alpha data of each pixel obtained after separation is encoded as an independent image frame data of the picture, and the Alpha data may be encoded in the video encoder based on the Y channel. Alpha stream data obtained after the Alpha data is encoded and color stream data obtained by encoding the RGB data are processed, so as to obtain compressed image data of the picture.

Picture header information data may be generated, so as to obtain, through encapsulation, the compressed image data including content such as the Alpha stream data, the color stream data, and the picture header information data. For a structure of the compressed image data obtained through picture encapsulation, refer to description of corresponding content in the following embodiment.

On a decoder side, if it is determined that the compressed image data needs to be decoded includes the picture header information data, the picture header information data is first obtained through parsing, and then subsequent processing is performed according to the picture header information data. For example, the RGB stream data and the Alpha stream data are respectively obtained from the compressed image data, the RGB stream data and the Alpha stream data of the picture are respectively decoded based on a video decoder, to correspondingly respectively output the RGB data and the Alpha data; and the RGBA data is generated according to the RGB data and the Alpha data, so as to finally perform decoding to obtain the picture through reconstruction.

Comparing to existing transparency data processing method such as WebP, the compressed image data generated by the disclosed method can reduce the file size by over 50%. Further, the time spent on encoding and decoding can be reduced by about 10%.

Figure 2:
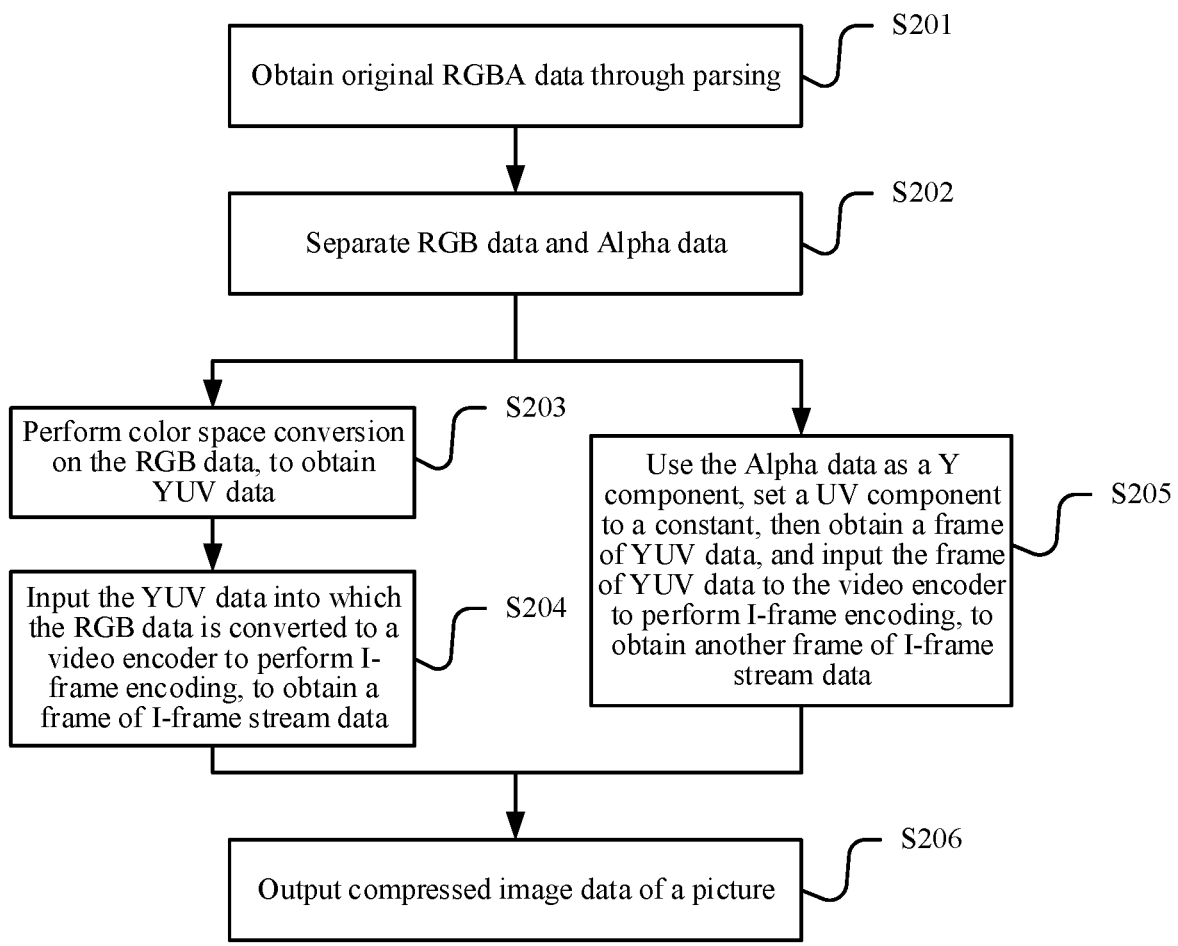
FIG. 2 is a schematic flowchart of a picture encoding method based on a video encoder according to an embodiment of this application.

FIG. 2 is a schematic flowchart of a picture encoding method based on a video encoder according to an embodiment of this application. The method may be performed by an intelligent terminal, and is used to encode a to-be-encoded picture, so as to obtain compressed image data of the picture, to facilitate storage or transmission. The method may specifically include the following steps:

S201: Obtain original RGBA data through parsing.

S202: Separate RGB data and Alpha data.

S203: Perform color space conversion on the RGB data, to obtain YUV data.

S204: Input the YUV data into which the RGB data is converted to a video encoder to perform I-frame encoding, to obtain a frame of I-frame stream data, that is, obtain color stream data.

S205: Use the Alpha data as a Y component, set a UV component to a constant, then obtain a frame of YUV data, and input the frame of YUV data to the video encoder to perform I-frame encoding, to obtain another frame of I-frame stream, that is, obtain Alpha stream data. The Alpha data input to the video encoder is an Alpha input value, and when the Alpha data is non-binary data, a value of the Alpha data is directly input to the video encoder as an Alpha input value. If the Alpha data is binary data, a maximum grayscale value (255) or a minimum grayscale value (0) obtained through corresponding normalization is input to the video encoder as an Alpha input value.

S206: Process I-frame streams generated in S204 and S205, and output compressed image data of a picture.

Figure 3:
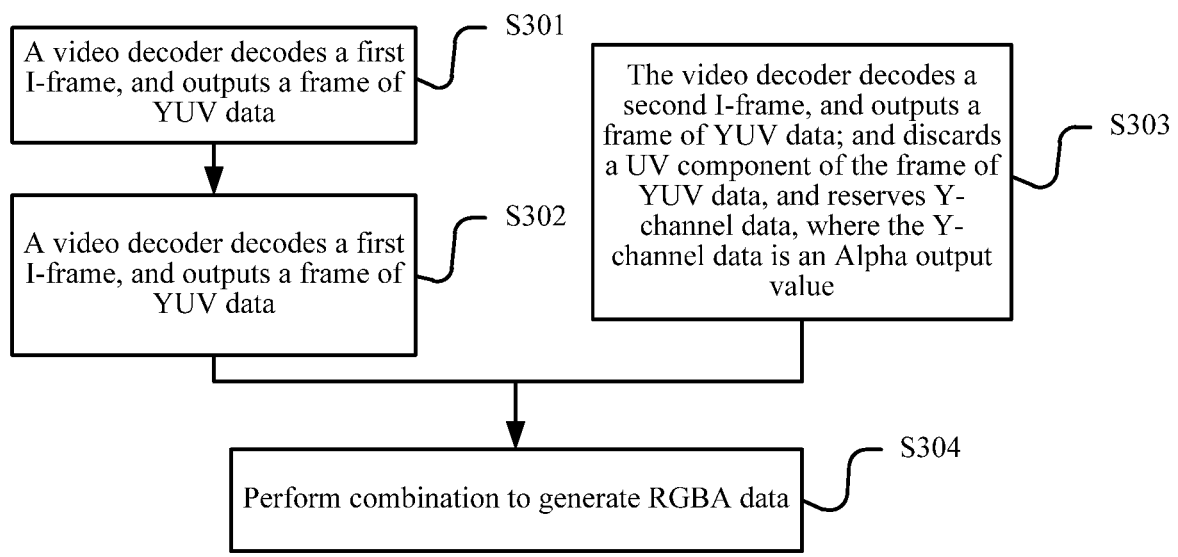
FIG. 3 is a schematic flowchart of a picture decoding method based on a video decoder according to an embodiment of this application.

Further, FIG. 3 is a schematic flowchart of a picture decoding method based on a video decoder according to an embodiment of this application. The method may be performed by an intelligent terminal, and is used to decode compressed image data of a picture obtained by encoding the picture. The method may specifically include the following steps:

S301: A video decoder decodes a first I-frame, and outputs a frame of YUV data.

S302: Perform color space conversion on the YUV data, to obtain RGB data.

S303: The video decoder decodes a second I-frame, and outputs a frame of YUV data; and discards a UV component of the frame of YUV data, and reserves Y-channel data, where the Y-channel data is an Alpha output value. If Alpha data of a picture is a piece of non-binary data, the obtained Y-channel data is the Alpha data. If Alpha data of a picture is a piece of binary data, whether the Alpha output value corresponding to the Y-channel data is greater than a preset threshold is judged/determined. If yes, the corresponding Alpha data is 1; otherwise, the corresponding Alpha data is 0. Alpha data of all pixels is finally obtained.

S304: Combine the Alpha data in S303 and the RGB data in S302 to generate RGBA data.

The RGB data and the Alpha data are both specific to corresponding pixels in the picture. Therefore, after the RGB data and the Alpha data are combined, the RGBA data of the entire picture may be obtained, and then the corresponding picture is restored through reconstruction.

When the Alpha data is encoded by using the video encoder, an input of the video encoder is YUV, and YUV includes three channels. Therefore, when the Alpha data is not binary, a value corresponding to the Alpha data is directly assigned to a Y channel, and a value assigned to a U channel and a V channel is a constant.

When the Alpha data is binary data, if a value corresponding to the Alpha data is 1, a value that is assigned to the Y channel and that is input by the video encoder is a maximum grayscale value, that is, 255; or if a value corresponding to the Alpha data is 0, a value that is assigned to the Y channel and that is input by the video encoder is a minimum grayscale value, that is, 0.

When the video decoder decodes the Y-channel data, if a value (transparency output value) obtained by decoding the Y channel is greater than a constant C, the Alpha data is restored to 1; or if a value obtained by decoding the Y channel is less than or equal to a constant C, the Alpha data is restored to 0. C is defined herein as any constant between the maximum value and the minimum value, for example, may be an intermediate value 128 of 0 and 255.

Figure 4:
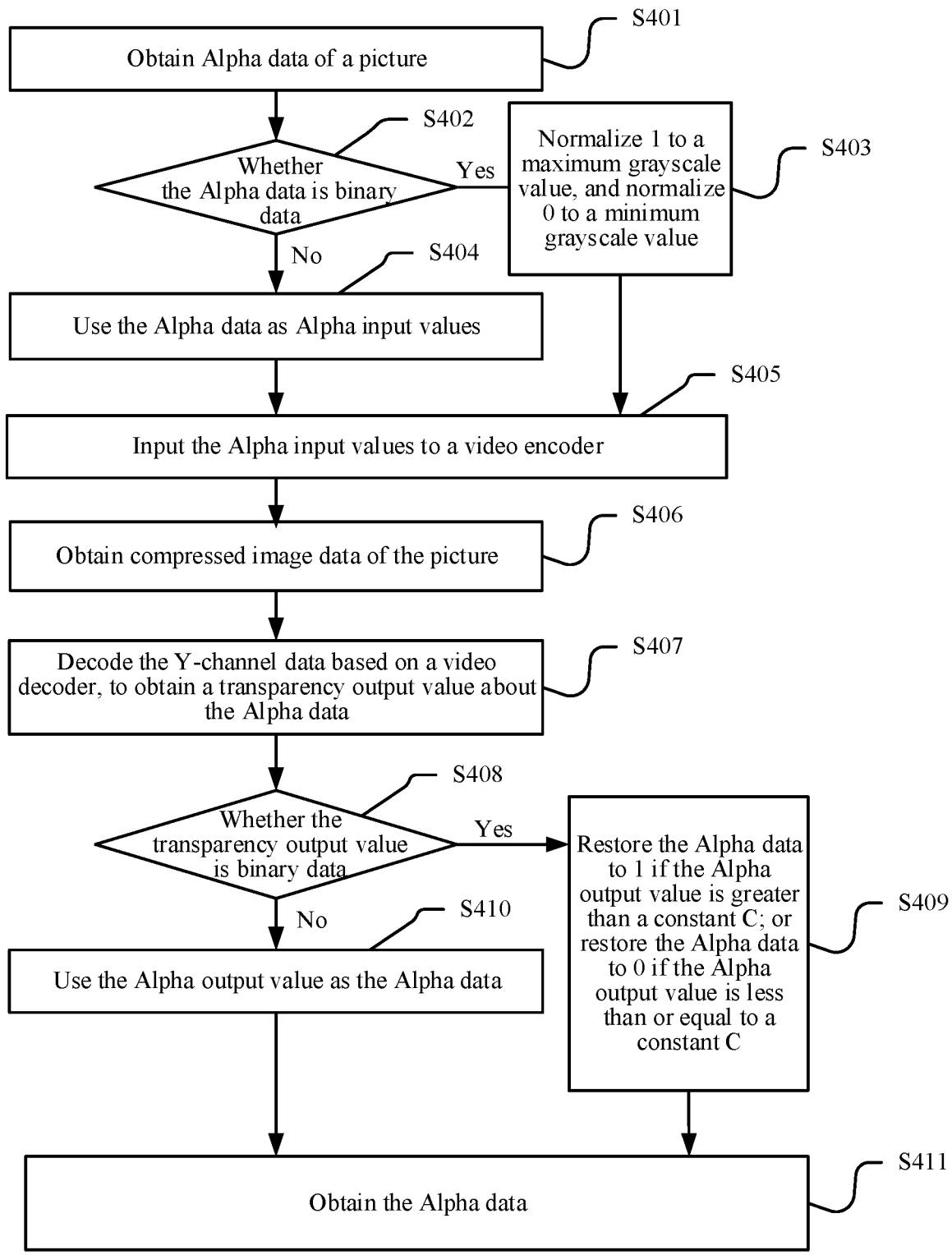
FIG. 4 is a schematic flowchart of an Alpha data encoding/decoding method according to an embodiment of this application.

FIG. 4 is a schematic flowchart of an Alpha data encoding/decoding method according to an embodiment of this application. The method may be performed by an intelligent terminal. The method according to some embodiments of this application mainly describes encoding/decoding about Alpha data of a picture, and may specifically include the following steps:

S401: Obtain Alpha data of a picture. Alpha data of each pixel of the picture may be obtained.

S402: Determine whether the Alpha data is binary data. If yes, S403 is performed; otherwise, S404 is performed. Whether each piece of obtained Alpha data includes only 0 or 1 may be determined. If yes, it is determined that the Alpha data is binary data. When the Alpha data is not binary, a value corresponding to the Alpha data is directly input to a video encoder as an Alpha input value.

S403: Normalize 1 to a maximum grayscale value, and normalize 0 to a minimum grayscale value. The maximum value may be 255, and the minimum value may be 0. The corresponding maximum value or minimum value is used as an Alpha input value.

S404: Use the Alpha data as an Alpha input value.

S405: Input the Alpha input value to a video encoder, and encode the Alpha input value as Y-channel data. UV channel encoding skips an encoding description selection and encoding process.

S406: Obtain compressed image data of the picture. Picture header information data and color stream data of the picture may be encapsulated in the compressed image data. In an embodiment, the picture header information data may include an image sequence header and image feature information data according to a need. The image sequence header is used to identify a type of the picture, and image feature information includes information used to indicate whether the picture includes the transparency data. The compressed image data may include the picture header information data, Alpha stream data, RGB stream data and the like.

When the compressed image data of the picture needs to be decoded, S407 may continue to be performed based on a video decoder.

S407: Decode the Y-channel data based on a video decoder, to obtain a transparency output value about the Alpha data. UV-channel data may directly skip a decoding process.

S408: Determine whether an Alpha output value obtained through decoding is binary data. If yes, S409 is performed. Otherwise, S410 is performed.

S409: Restore the Alpha data to 1 if the Alpha output value is greater than a constant C; or restore the Alpha data to 0 if the Alpha output value is less than or equal to a constant C.

S410: Use the Alpha output value as the Alpha data.

S411: Obtain the Alpha data through decoding. If the Alpha data is not binary data, the transparency output value is the Alpha data; or if the Alpha data is binary data, 1 or 0 obtained through restoration in S408 is used as the Alpha data. Complete Alpha data of the picture is obtained according to each piece of obtained Alpha data.

Figure 5:
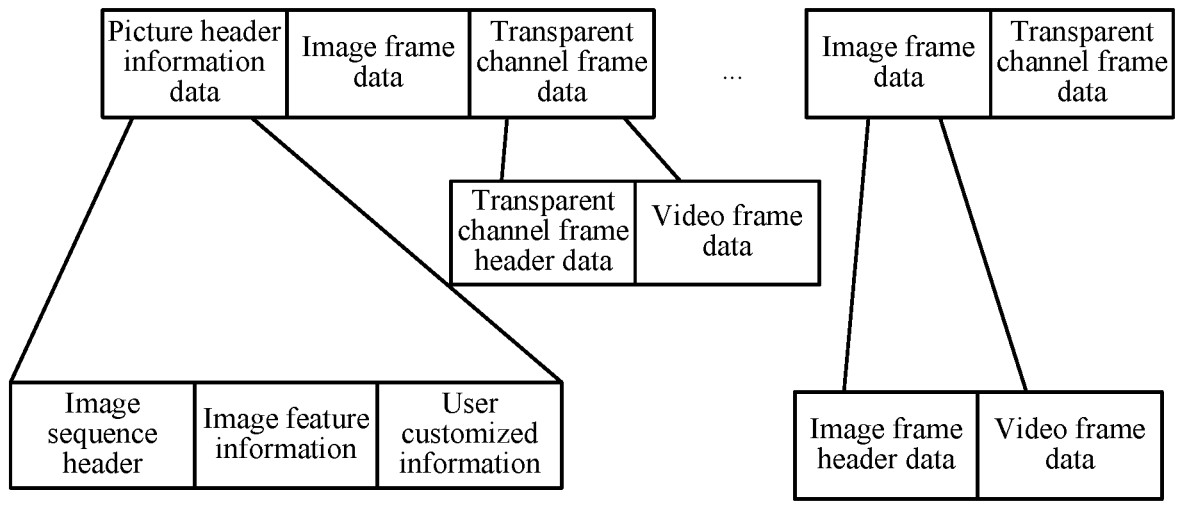
FIG. 5 is a schematic diagram of a composition structure of an image sequence according to an embodiment of this application.

In some embodiments of this application, a picture file is an image sequence, and the image sequence is a top-level syntactic structure of a stream. A composition structure of a complete image sequence is shown in FIG. 5. Main components of the image sequence include picture header information data, image frame data, and transparent channel frame data. In some embodiments of this application, the image indicates a frame of drawing, and the picture is a complete image file, and may include one or more images.

tion, and the picture header information data is followed by a string of image stream data (which may also be referred to as image encoding data).

The image frame data is stream data generated by encoding RGB data of an image, includes two parts, namely, image frame header data and video frame data, the image frame header data is used to indicate feature information of each image in the image sequence (that is, feature information of RGB stream data), and each image frame carries a piece of image frame header data. The video frame data is encoded stream data obtained after video encoding is performed on information of each image frame in the image sequence, and the video frame data herein includes the RGB stream data.

The transparent channel frame data is stream data generated by encoding Alpha channel data of an image, and includes two parts, namely, transparent channel frame header data and video frame data. The transparent channel frame header data is used to describe feature information of an Alpha channel data frame (that is, Alpha stream data), and each piece of transparent channel frame data carries a piece of transparent channel frame header data. The video frame data is encoded stream data obtained after video encoding is performed on information of each image frame in the image sequence, and the video frame data herein includes the Alpha stream data.

In some embodiments of this application, a data format used for image encoding may be YUV field data, and supports three formats, namely, YUV 4:4:4, YUV 4:2:0 and YUV 4:0:0, or the RGB data may be directly encoded.

For a specific structure of the image sequence header, refer to Table 1.

TABLE 1

| Image file identifier | Decoder identifier | Version identifier |
| --- | --- | --- |

An image file identifier image identifier is a bit string 'AVSP' (an identifier), and is used to identify that this is an Audio Video coding Standard (AVS) image file.

A decoder identifier codec_id is a four-byte character string, and is used to identify a model of a decoder kernel used for current picture decoding. When an AVS2 kernel is used, codec_id is 'AVS2'.

A version identifier version_id is an 8-bit unsigned number, and is used to identify a level of the used decoder kernel, and the level is a subset of syntax, semantics and algorithms that are specified.

For a specific structure of the image feature information data, refer to Table 2.

TABLE 2

| Image feature information start code | Image feature information data length | Image transparency flag | Dynamic image flag | YUV color space format | Lossless mode flag | YUV value limit range flag | Reserved bit | Image width | Image height | Image frame number |
| --- | --- | --- | --- | --- | --- | --- | --- | --- | --- | --- |

In some embodiments of this application, the picture header information data is a start segment of the image sequence, and the picture header information data includes three parts, namely, an image sequence header, image feature information data, and user customized information data. The picture header information data described basic feature information of each image frame and customized informa- An image feature information start code image_feature_start_code is a bit string '0x000001B9', and identifies beginning of the image feature information data.

An image feature information data length image_feature_data_length is a 16-bit unsigned integer, and is used to identify a length (using a byte as a unit) of the image feature information data.

An image transparency flag alpha_flag is a binary variable. When a value of the image transparency flag is '1', it indicates that the image carries an Alpha channel, and when a value of the image transparency flag is '0', it indicates that the image carries no Alpha channel.

A dynamic image flag dynamic_picture_flag is a binary variable. When a value of the dynamic image flag is '1', it indicates that the image is a dynamic image, and when a value of the dynamic image flag is '0', it indicates that the image is a static image.

A YUV color space format yuv_format is a 2-bit unsigned integer, and specifies a format of a chrominance component used for image compression.

A lossless mode flag lossless_flag is a binary variable. When a value of the lossless mode flag is '1', it indicates that a lossless encoding manner is used for the current image, and when a value of the lossless mode flag is '0', it indicates that a lossy compression encoding manner is used for the current image. When the lossless encoding manner is used, a process of converting YUV into RGB is not required.

A YUV value limit range flag yuv_limit_range_flag is a binary variable. When a value of the YUV value limit range flag is '1', it indicates that a YUV value limit range for image decoding and output conforms to an ITU-R BT.601 standard. To be specific, a luminance falls within [16, 235], and a chrominance falls within [16, 240]. When a value of the YUV value limit range flag is '0', it indicates that a full range [0, 255] is used as a YUV value limit range for image decoding and output.

Reserved bits reserved bits are a 10-bit unsigned integer. Bits are reserved.

An image width image_width is a 24-bit unsigned integer, and indicates a width of the image, and the image width should range from 0 to 65535.

An image height image_height is a 24-bit unsigned integer, and indicates a height of the image, and the image height should range from 0 to 65535.

An image frame number frame number is a 24-bit unsigned integer, and indicates a total frame number of an image file. The syntactic element occurs only when dynamic_picture_flag is 1, that is, the image is a dynamic image.

The user customized information data is shown in Table 3.

TABLE 3

| User customized information start code | User customized information length |
| --- | --- |

A user customized information start code image_user_data_start_code is a bit string '0x000001BC', and identifies beginning of the user customized information data.

A user customized information length user_data_length is a 32-bit unsigned integer, and indicates a length of the current user customized information data.

A structure of image frame header data is shown in Table 4.

TABLE 4

| Image frame start code | Video frame stream length | Delay time |
| --- | --- | --- |

An image frame start code image_frame_start_code is a bit string '0x000001BA', and identifies beginning of the image frame header data.

A video frame stream length image_frame_stream_length is a 32-bit unsigned integer, and indicates a length of a current image frame stream.

A delay time delay_time is a 16-bit unsigned integer, indicates that a data stream continues to be processed after a specified time is suspended, and has a unit of millisecond. The syntactic element occurs only when dynamic_picture_flag is 1, that is, the image is a dynamic image.

A structure of the transparent channel frame header data is shown in Table 5.

TABLE 5

| Transparent channel frame start code | Transparent channel frame stream length |
| --- | --- |

A transparent channel frame start code alpha_channel_start_code is a bit string '0x000001BB', and identifies beginning of the transparent channel frame header data.

A transparent channel frame stream length alpha_frame_stream_length is a 32-bit unsigned integer, and indicates a length of a current transparent channel frame stream.

A start code is a group of particular character strings. In some embodiments of this application, there are a picture header information data start code and an image frame header data start code. The image frame header data start code includes two types, namely, the image frame start code and the transparent channel frame start code.

A start code is formed by a start code prefix and a start code value. The start code prefix is a bit string '0000 0000 0000 0000 0000 0001'. Byte alignment needs to be performed on the start code.

The start code value is an 8-bit integer, and is used to indicate a type of the start code.

It should be noted that, the foregoing is only exemplary description, and a name of each piece of information included in the picture header information data and frame header information, a location of each piece of information in the frame header information, and a number indicating bits occupied by each piece of information are not limited in some embodiments of this application.

In some embodiments of this application, when the transparency data of the picture is encoded/decoded, data about a picture transparency is encoded/decoded as data passing through the corresponding encoding/decoding channel of the video encoder or the video decoder, so as to save traffic bandwidth and storage costs of the picture carrying the Alpha channel to a particular extent, improve picture compression efficiency, and save encoding/decoding time. Comparing with existing method, the disclosed method can greatly improve the compression efficiency while maintaining same image quality. The disclosed method provides an approach for improving performance of the video encoder itself for transparency data encoding, which saves encoding time and decoding time.

Figure 6:
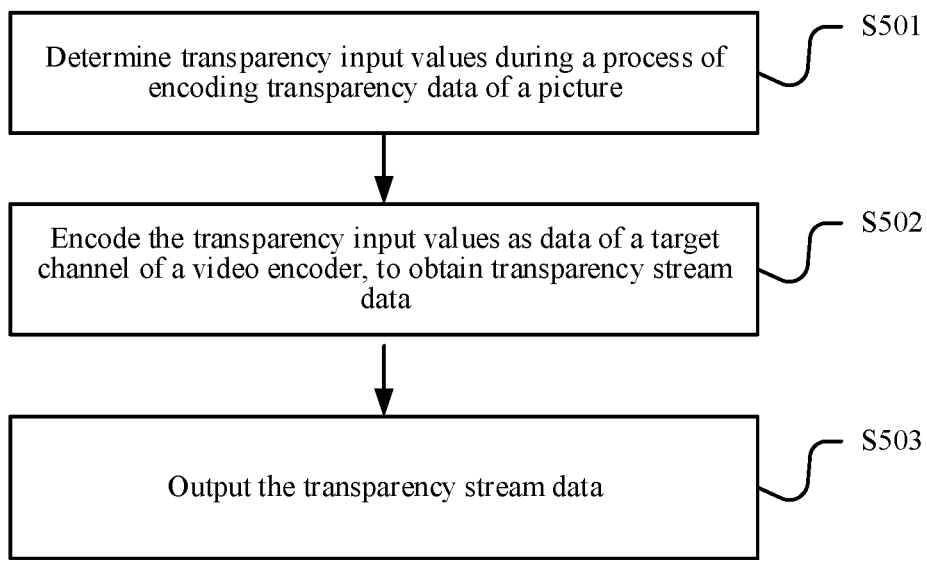
FIG. 6 is a schematic flowchart of a picture file processing method according to an embodiment of this application.

FIG. 6 is a schematic flowchart of a picture file processing method according to an embodiment of this application. The method according to some embodiments of this application is mainly used for encoding a picture, and may be performed by an intelligent terminal. The intelligent terminal may be a terminal that can process image data such as a picture or a video, such as a smartphone, a tablet computer, or an intelligent wearable device. The method may be performed by a terminal or a server. The method includes the following steps:

S501: Select transparency input values when transparency data of a picture is encoded. Selecting the transparency input values is determining the transparency input values according to the transparency data of the picture. The transparency data of the picture is used to indicate a transparency of a corresponding pixel in the picture. A value of the transparency data includes two types. One type is a binary type, that is, the transparency data is binary data 0 or 1, 0 indicates that the pixel corresponding to the transparency data is completely transparent, and 1 indicates that the pixel corresponding to the transparency data is completely opaque. The other type is an ordinary data type, and may be specifically data ranging from 0 to 255, where 0 indicates completely transparent, 255 indicates completely opaque, 128 may be considered as translucent, and the rest can be deduced by analogy.

The picture includes a frame sequence formed by one or more image frames, and the transparency data includes transparencies of pixels in the one or more image frames. When the transparency data is binary data, the determining the transparency input values may specifically include: determining, if a value indicated by a transparency of a pixel in the transparency data of the picture is 1, that a transparency input value of the pixel is a preset first input value; or determining, if a value indicated by a transparency of a pixel in the transparency data of the picture is 0, that a transparency input value of the pixel is a preset second input value, where the first input value is different from the second input value. Specifically, the first input value may be 255, that is, when a value indicated by the transparency data is 1, an input value that is input to a video encoder and that is used for selecting the transparency data is 255; and the second input value may be 0, that is, when a value indicated by the transparency data is 0, an input value that is input to the video encoder and that is used for selecting the transparency data is 0. When the transparency input values corresponding to the transparency is determined, whether the transparency data of the picture is binary data is first determined. When the transparency data is binary data, the foregoing operation of determining the transparency input values corresponding to the transparency is performed.

S502: Encode the transparency input values as data of a target channel of a video encoder, to obtain transparency stream data. A target channel is a preset target channel of the video encoder. In some embodiments of this application, the transparency data may be encoded as Y-channel data, U-channel data, or V-channel data.

In an optional embodiment, the encoding the transparency input values as data of a preset target channel of a video encoder includes: using the transparency input values as the Y-channel data, and encoding the transparency input values based on a Y-channel data encoding manner in the video encoder, where U-channel data and V-channel data that are input to the video encoder are a preset constant. For example, the data that needs to be encoded includes three channels: Y, U, and V. The preset target channel is Y-channel, and the transparency input values are encoded as Y-channel data based on a Y-channel data encoding manner in the video encoder. Further, constant values are assigned to be used as U-channel data and V-channel data for encoding. It can be understood that the preset target channel may also be U or V channel, and data of the two channels other than the preset target channel are assigned with constant values.

In an embodiment, the encoding the transparency input values as data of a preset target channel of a video encoder includes: using the transparency input values as the U-channel data, and encoding the transparency input values based on a U-channel data encoding manner in the video encoder, where Y-channel data and V-channel data that are input to the video encoder are a preset constant.

In an embodiment, the encoding the transparency input values as data of a preset target channel of a video encoder includes: using the transparency input values as the V-channel data, and encoding the transparency input values based on a V-channel data encoding manner in the video encoder, where Y-channel data and U-channel data that are input to the video encoder are a preset constant.

When encoding is performed by using the video encoder, channels other than the selected target channel may not be encoded, and may directly skip encoding mode selection and encoding processing, to ensure that data of the selected target channel can be correctly encoded, and stream data of the transparency data may be obtained.

S503: Output the transparency stream data. Compressed image data of the picture is generated according to the transparency stream data and color stream data that is obtained after the video encoder encodes color data of the picture. The transparency stream data includes transparency stream data of pixels on corresponding location coordinates on the picture.

The compressed image data of the picture includes the transparency stream data and the color stream data of the picture, and the color stream data is data obtained after the video encoder encodes the color data of the picture. The transparency stream data and the color stream data may be directly encapsulated to obtain the corresponding compressed image data. The obtained compressed image data includes the color stream data and the transparency stream data that are stored in a same pixel location order.

The color stream data of the picture is mainly the RGB stream data of the picture, and may be specifically obtained through encoding by another image encoder, or obtained through encoding by the video encoder in another time period different from a time period in which the transparency data is encoded. For example, before encoding the transparency data, the video encoder performs encoding to obtain the color stream data of the picture.

In some embodiments of this application, when the transparency data of the picture is encoded, data about a picture transparency is encoded as data passing through the corresponding encoding channel of the video encoder, so as to save traffic bandwidth and storage costs of the picture carrying the Alpha channel to a particular extent, improve picture compression efficiency, and save encoding time.

In some examples, the obtaining the transparency data of the picture includes the following steps: obtaining image data of the picture; and determining the transparency data of the picture according to the image data.

The image data of the picture is original RGBA data of the picture, and the RGB data and the Alpha data are separated, to obtain the Alpha data, that is, the foregoing transparency data.

Figure 7:
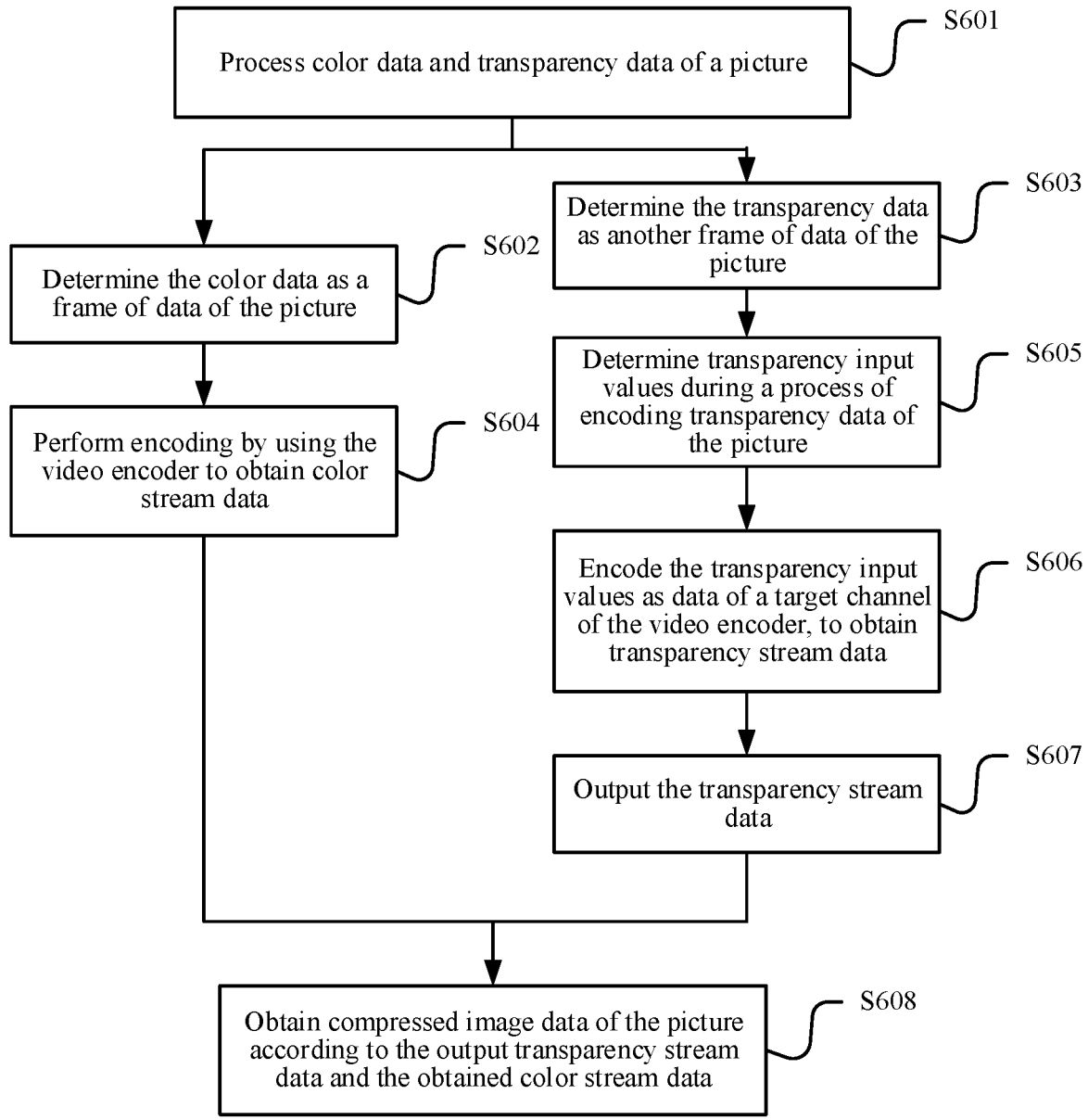
FIG. 7 is a schematic flowchart of a picture file processing method according to an embodiment of this application.

FIG. 7 is a schematic flowchart of another picture file processing method according to an embodiment of this application. The method according to some embodiments of this application is mainly used for encoding a picture, and may be performed by an intelligent terminal. The intelligent terminal may be a terminal that can process image data such as a picture or a video, such as a smartphone, a tablet computer, or an intelligent wearable device. The method may be further performed by a server. The method includes the following steps:

S601: Process color data and transparency data of a picture. The color data and the transparency data of the picture are determined according to image data of the picture (for example, RGBA data), and color data, that is, RGB data and transparency data, that is, Alpha data of each pixel in the picture may be respectively obtained in a same order. For example, the RGB data and the Alpha data of each pixel are extracted sequentially in an order from left to right and from top to bottom.

S602: Determine the color data as a frame of data of the picture, so as to be encoded by using a video encoder. To be specific, the color data is determined as an image frame data of the picture to be input to the video encoder for encoding, to obtain color stream data.

S603: Determine the transparency data as another frame of data of the picture, so as to be encoded by using the video encoder.

After being determined, the color data and the transparency data are respectively encoded by using the video encoder. The color data and the transparency data may be encoded simultaneously by using two video encoders, or the color data and the transparency data may be encoded successively by using one video encoder.

S604: Perform, when the color data determined in S602 is encoded, encoding by using the video encoder to obtain the color stream data. The RGB data is converted into YUV data, to obtain Y-channel data, U-channel data and V-channel data of the video encoder, and the Y-channel data, the U-channel data and the V-channel data are respectively encoded by using the video encoder, to obtain the color stream data of the picture.

S605: Select transparency input values when transparency data of a picture is encoded (i.e., during a process of encoding transparency data of a picture).

S606: Encode the transparency input values as data of a target channel of the video encoder, to obtain transparency stream data.

S607: Output the transparency stream data.

S608: Obtain compressed image data of the picture according to the output transparency stream data and the obtained color stream data.

The compressed image data of the picture includes picture header information data of the picture. When S608 is performed, the picture header information data of the picture may be generated. The picture header information data of the picture is generated according to the color stream data and the transparency stream data, where the picture header information data includes basic feature information of one or more image frames in the picture. The picture header information data may indicate that the compressed image data is a file obtained by encoding the picture by the video encoder. The picture header information data includes: an image sequence header and image feature information data; and the image sequence header is used to identify a type of the picture, and image feature information includes information used to indicate whether the picture includes the transparency data. For specific description of the picture header information data, refer to description of related content in the foregoing embodiment.

For specific implementation of steps in the method according to some embodiments of this application, refer to description of related content in the foregoing embodiments.

In some embodiments of this application, when the transparency data of the picture is encoded, data about a picture transparency is encoded as data passing through the corresponding encoding channel of the video encoder, so as to save traffic bandwidth and storage costs of the picture carrying the Alpha channel to a particular extent, improve picture compression efficiency, and save encoding time.

Figure 8:
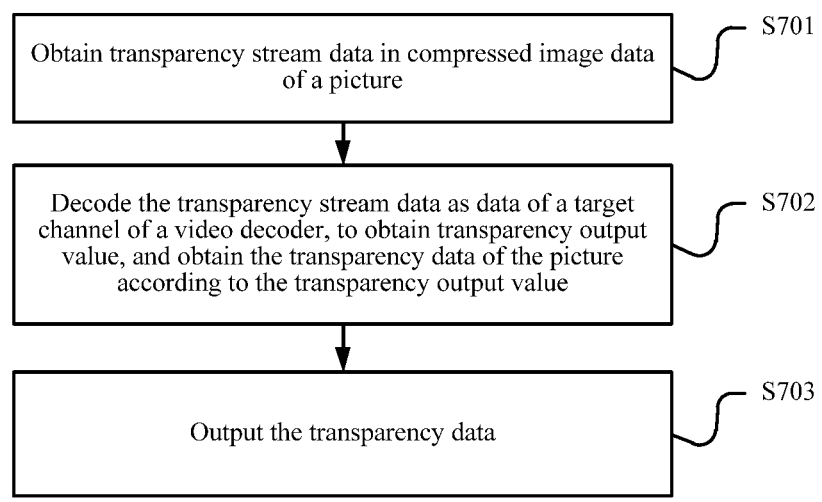
FIG. 8 is a schematic flowchart of a picture file processing method according to an embodiment of this application.

FIG. 8 is a schematic flowchart of still another picture file processing method according to an embodiment of this application. The method according to some embodiments of this application is a picture decoding method, and may be performed by an intelligent terminal. The intelligent terminal may be a terminal that can process image data such as a picture or a video, such as a smartphone, a tablet computer, or an intelligent wearable device. The method may be further performed by a server. The method includes the following steps:

S701: Obtain transparency stream data in compressed image data of a picture. The compressed image data is compressed image data obtained according to the foregoing picture file processing method (transparency encoding method). Color stream data and the transparency stream data may be respectively extracted from the stored compressed image data of the picture. Transparency data may be obtained from the stored compressed image data based on a rule at the time of encapsulating the color stream data and the transparency stream data.

S702: Decode the transparency stream data as data of a target channel of a video decoder (a preset target channel of the video decoder), to obtain transparency output value, and obtain transparency data of the picture according to the transparency output value. Channels corresponding to data of a target channel at the time of decoding the transparency stream data, and data of a target channel at the time of encoding the transparency data corresponding to the transparency stream data are completely the same. For example, the transparency data is encoded as the Y-channel data of the video encoder at the time of encoding the transparency data, and therefore, the transparency stream data is also decoded as the Y-channel data of the video decoder at the time of decoding the corresponding transparency stream data.

S703: Output the transparency data. To be specific, image data of the picture is generated according to the transparency data and color data of the picture that is obtained after the video decoder decodes color stream data in the compressed image data. The data of the picture is obtained after the transparency data and the color data of the picture are combined, and the color data of the picture is data obtained after the video decoder decodes the color stream data in the compressed image data.

The RGB data of the picture obtained after the color stream data of the picture is decoded may be specifically obtained through decoding by another image decoder, or obtained through decoding by the video decoder in a time period different from (or same as) a time period in which the transparency data is decoded. For example, before decoding the transparency stream data, the video decoder decodes the color stream data of the picture to obtain the color data of the picture.

In some embodiments of this application, when the transparency data of the picture is decoded, data about a picture transparency is decoded as data passing through the corresponding decoding channel of the video decoder, so as to save traffic bandwidth and storage costs of the picture carrying the Alpha channel to a particular extent, improve picture compression efficiency, and save decoding time.

Figure 9:
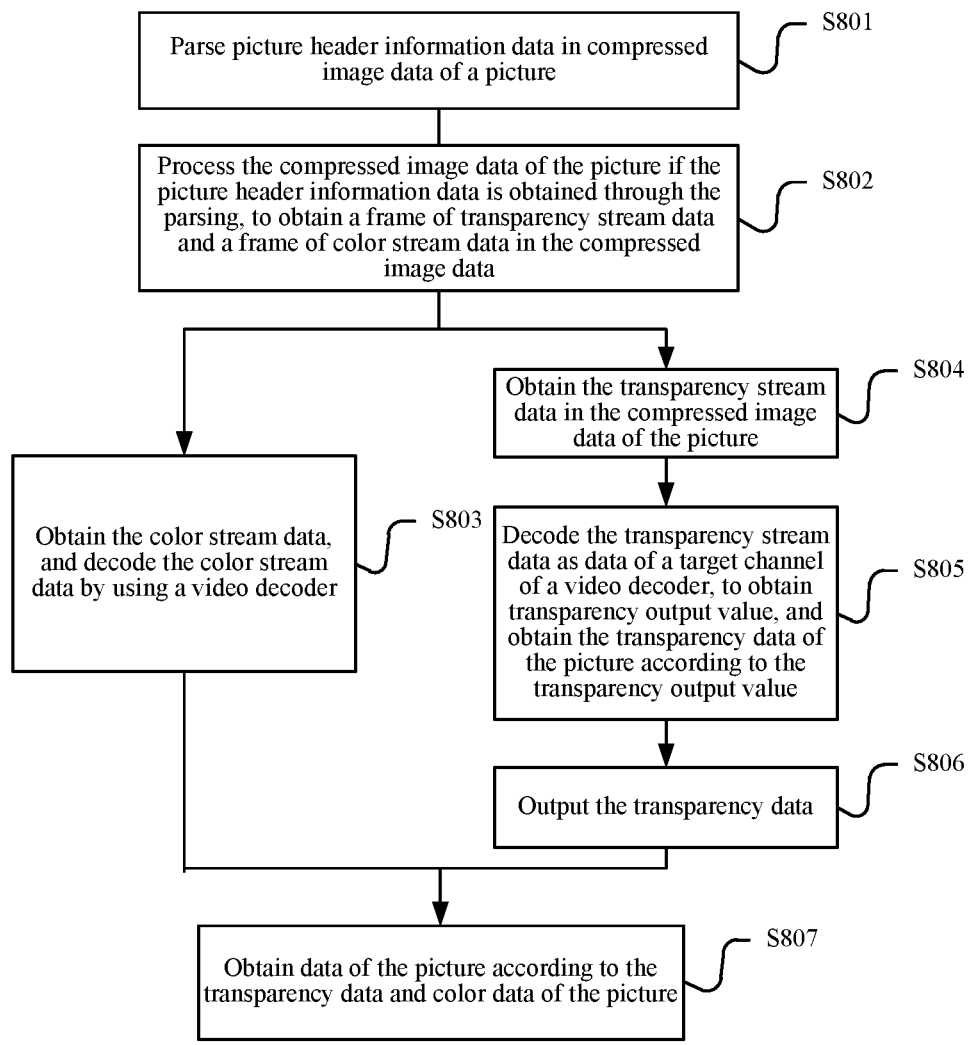
FIG. 9 is a schematic flowchart of a picture file processing method according to an embodiment of this application.

FIG. 9 is a schematic flowchart of yet another picture file processing method according to an embodiment of this application. The method according to some embodiments of this application is mainly used for decoding compressed image data of a picture, and may be performed by an intelligent terminal. The intelligent terminal may be a terminal that can process image data such as a picture or a video, such as a smartphone, a tablet computer, or an intelligent wearable device. The method may be further performed by a server. The method includes the following steps:

S801: Parse picture header information data in compressed image data of a picture. The picture header information data includes: an image sequence header and image feature information data; and the image sequence header is used to identify a type of the picture, and image feature information includes information used to indicate whether the picture includes the transparency data. For specific description of the picture header information data, refer to description of related content in the foregoing embodiment.

S802: Process the compressed image data of the picture if the picture header information data is obtained through the parsing, to obtain a frame of transparency stream data and a frame of color stream data in the compressed image data. After the picture header information data is obtained through the parsing, when it is determined that the picture header information data indicates that the picture is a picture including the transparency data, S802 is performed. To be specific, if the picture header information data is obtained through the parsing and when the picture header information data indicates that the compressed image data includes the transparency stream data, an operation of obtaining the transparency stream data in the compressed image data of the picture is performed.

S803: Obtain the color stream data, and decode the color stream data by using a video decoder. YUV-channel data in the color stream data is respectively decoded by using the video decoder, to obtain YUV data of the picture, and then the YUV data is converted into RGB data corresponding to YUV.

S804: Obtain the transparency stream data in the compressed image data of the picture.

S805: Decode the transparency stream data as data of a target channel of a video decoder, to obtain transparency output value, and obtain the transparency data of the picture according to the transparency output value.

The transparency output value is a value that is output after the video decoder decodes the data of the target channel. Whether the transparency data of the picture is binary data may be set in the picture header information data. If the transparency data of the picture is binary data, S805 may specifically include: decoding the transparency stream data as the data of the target channel of the video decoder; and determining, if the transparency output value obtained after decoding is greater than a preset threshold, a value indicated by the transparency data corresponding to the transparency output value after decoding is 1; or determining, if the transparency output value obtained after decoding is not greater than a preset threshold, a value indicated by the transparency data corresponding to the transparency output value after decoding is 0. Pieces of obtained transparency data corresponding to all pixels are combined to obtain complete transparency data of the picture, so that the complete transparency data and complete color data are combined to restore the picture.

S806: Output the transparency data.

S807: Obtain data of the picture according to the transparency data and color data of the picture. The data of the picture is obtained after the transparency data and the color data of the picture are combined, and the color data of the picture is data obtained after the video decoder decodes the color stream data in the compressed image data.

For specific implementation of steps in the method according to some embodiments of this application, refer to description of related content in the foregoing embodiments.

In some embodiments of this application, when the transparency data of the picture is decoded, data about a picture transparency is decoded as data passing through the corresponding decoding channel of the video decoder, so as to save traffic bandwidth and storage costs of the picture carrying the Alpha channel to a particular extent, improve picture compression efficiency, and save decoding time.

Figure 10:
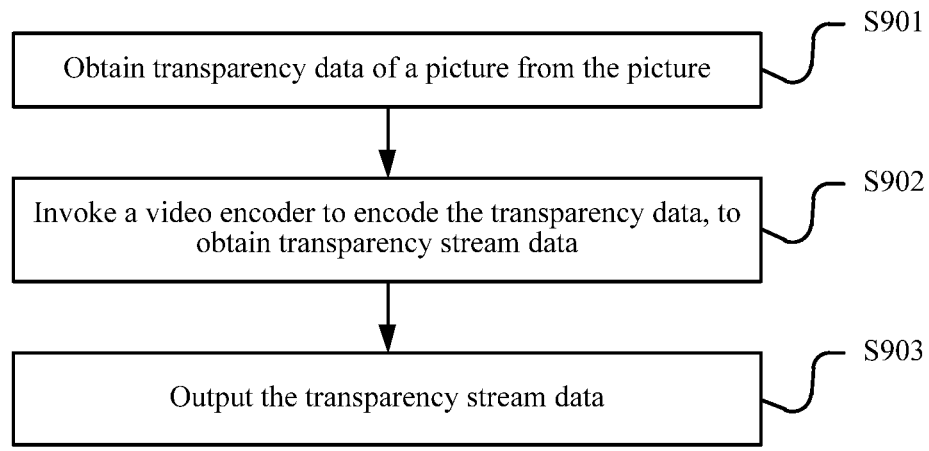
FIG. 10 is a schematic flowchart of an encoding-side picture processing method according to an embodiment of this application.

FIG. 10 is a schematic flowchart of an encoding-side picture processing method according to an embodiment of this application. The method according to some embodiments of this application may be performed by an intelligent terminal. The intelligent terminal may be a terminal that can process image data such as a picture or a video, such as a smartphone, a tablet computer, or an intelligent wearable device. The method includes the following steps:

S901: Obtain transparency data of a picture from the picture. To be specific, the transparency data of the picture is obtained from image data of the picture.

S902: Invoke a video encoder to encode the transparency data, to obtain transparency stream data.

S903: Output the transparency stream data. Compressed image data of the picture may be obtained according to the transparency stream data and color stream data of the picture. To be specific, the compressed image data of the picture is determined according to the transparency stream data.

In an embodiment, the transparency data may be used as data of a target channel (a preset target channel) of the video encoder, so as to invoke the video encoder to encode the transparency data, where the target channel includes any one of three channels of the video encoder. In an embodiment, the target channel may be any one of a Y channel, a U channel and a V channel of the video encoder.

In some examples, the encoding the transparency includes the following step:

determining transparency input values according to the transparency data, where the invoking a video encoder to encode the transparency data, to obtain transparency stream data includes:

inputting the transparency input values to the video encoder, to obtain the transparency stream data output by the video encoder.

In some examples, the transparency data is binary data, the transparency data includes transparencies of pixels in the picture, and the determining transparency input values according to the transparency data includes steps of:

determining, when a value indicated by a transparency of a pixel in the transparency data of the picture is 1, that a transparency input value corresponding to the pixel is a preset first input value; and determining, when a value indicated by a transparency of a pixel in the transparency data of the picture is 0, that a transparency input value of the pixel is a preset second input value, where the first input value is different from the second input value.

If a value indicated by the transparency data of the picture is 1, the transparency data is converted into the preset first input value, and the first input value is used as target channel data of the video encoder, so as to invoke the video encoder to encode the transparency data. If a value indicated by the transparency data of the picture is 0, the transparency data is converted into the preset second input value, and the second input value is used as target channel data of the video encoder, so as to invoke the video encoder to encode the transparency data. The first input value is different from the second input value.

For specific implementation of steps in the method according to some embodiments of this application, refer to description of related content in the embodiments corresponding to the foregoing accompanying drawings.

In some embodiments of this application, when the transparency data of the picture is encoded, data about a picture transparency is encoded as data passing through the corresponding encoding channel of the video encoder, so as to save traffic bandwidth and storage costs of the picture carrying the Alpha channel to a particular extent, improve picture compression efficiency, and save encoding time.

Figure 11:
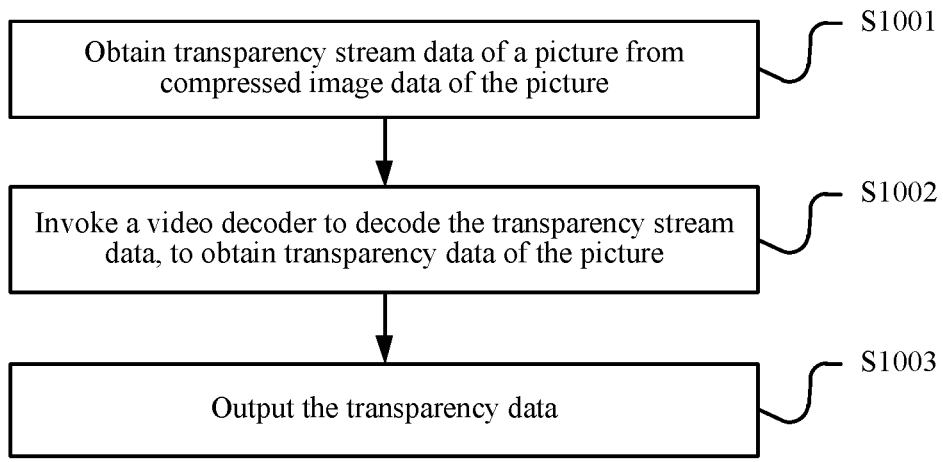
FIG. 11 is a schematic flowchart of a decoding-side picture processing method according to an embodiment of this application.

FIG. 11 is a schematic flowchart of a decoding-side picture processing method according to an embodiment of this application. The method according to some embodiments of this application may be performed by an intelligent terminal. The intelligent terminal may be a terminal that can process image data such as a picture or a video, such as a smartphone, a tablet computer, or an intelligent wearable device. The method may be further performed by a server. The method includes the following steps:

S1001: Obtain transparency stream data of a picture from compressed image data of the picture.

The compressed image data is compressed image data obtained according to the foregoing picture file processing method (transparency data encoding method, namely, the method in FIG. 10). Specifically, alternatively, when it is learned, based on picture header information data in the compressed image data, that the compressed image data of the picture includes transparency data of the picture, S1001 is performed.

S1002: Invoke a video decoder to decode the transparency stream data, to obtain transparency data of the picture.

S1003: Output the transparency data. Image data of the picture is determined according to the transparency data.

In an embodiment, the transparency stream data may be used as data of a target channel (a preset target channel) of the video decoder, so as to invoke the video decoder to decode the transparency data, where the target channel includes any one of three channels of the video decoder. In an embodiment, the target channel may be any one of a Y channel, a U channel and a V channel of the video encoder.

In an embodiment, the transparency output value includes transparency output values of pixels in the picture, the transparency data of the picture is binary data, and the invoking a video decoder to decode the transparency stream data, to obtain transparency data of the picture includes: decoding the transparency stream data as the data of the target channel of the video decoder; and learning, if an output value obtained after decoding is greater than a preset threshold, that a value indicated by the transparency data of the picture after decoding is 1; or learning, if an output value obtained after decoding is not greater than a preset threshold, that a value indicated by the transparency data of the picture after decoding is 0.

For specific implementation of steps in the method according to some embodiments of this application, refer to description of related content in the embodiments corresponding to the foregoing accompanying drawings.

In some embodiments of this application, when the transparency data of the picture is decoded, data about a picture transparency is decoded as data passing through the corresponding decoding channel of the video decoder, so as to save traffic bandwidth and storage costs of the picture carrying the Alpha channel to a particular extent, improve picture compression efficiency, and save decoding time.

A picture processing apparatus and an intelligent terminal according to the embodiments of this application are correspondingly described below.

Figure 12:
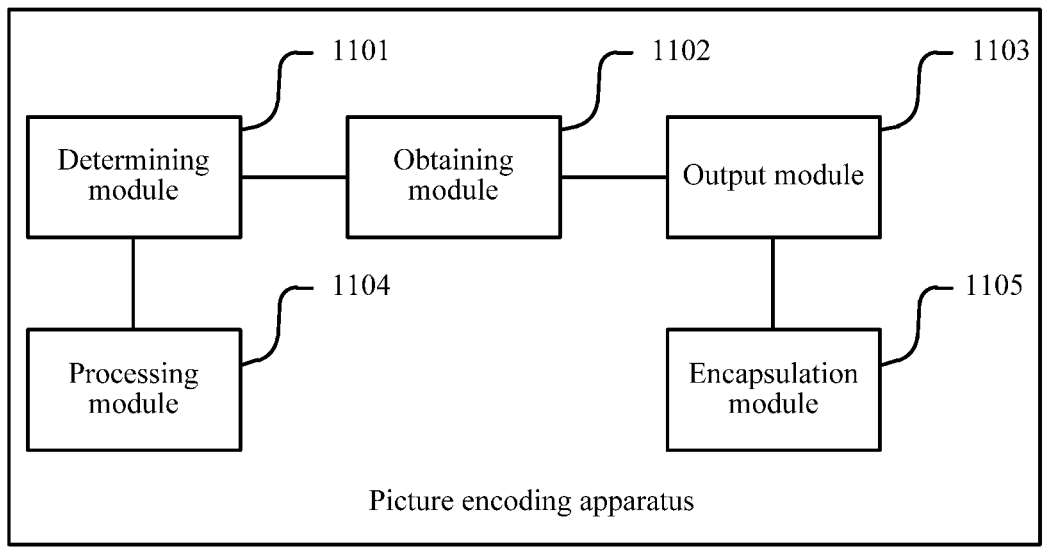
FIG. 12 is a schematic structural diagram of a picture processing apparatus according to an embodiment of this application.

FIG. 12 is a schematic structural diagram of a picture processing apparatus according to an embodiment of this application. The apparatus according to some embodiments of this application is a picture encoding apparatus, and may be set in various intelligent terminals. The intelligent terminal may be a terminal that can process image data such as a picture or a video, such as a smartphone, a tablet computer, or an intelligent wearable device. The apparatus may alternatively be set in a server. The apparatus according to some embodiments of this application includes the following modules.

A determining module 1101 is configured to select transparency input values when transparency data of a picture is encoded. An obtaining module 1102 is configured to encode the transparency input values as target channel data of a video encoder, to obtain transparency stream data. An output module 1103 is configured to output the transparency stream data, compressed image data of the picture including the transparency stream data and color stream data of the picture, and the color stream data being data obtained after the video encoder encodes color data of the picture.

In an embodiment, the determining module 1101, configured to select the transparency input values of the transparency data as a preset first input value if a value indicated by the transparency data of the picture is 1; or select the transparency input values of the transparency data as a preset second input value if a value indicated by the transparency data of the picture is 0, where the first input value is different from the second input value.

In an embodiment, the determining module 1101 is further configured to determine whether the transparency data of the picture is binary data, and determine, according to a judgment result, whether the value indicated by the transparency data of the picture is 1 in the binary data or 0 in the binary data.

In an embodiment, input data of the video encoder includes: Y-channel data, U-channel data and V-channel data; and the obtaining module 1102 is configured to use the transparency input values as the Y-channel data, and encode the transparency input values based on a Y-channel data encoding manner in the video encoder, where U-channel data and V-channel data that are input to the video encoder are a preset constant.

In an embodiment, input data of the video encoder includes: Y-channel data, U-channel data and V-channel data; and the obtaining module 1102 is configured to use the transparency input values as the U-channel data, and encode the transparency input values based on a U-channel data encoding manner in the video encoder, where Y-channel data and V-channel data that are input to the video encoder are a preset constant.

In an embodiment, input data of the video encoder includes: Y-channel data, U-channel data and V-channel data; and the obtaining module 1102 is configured to use the transparency input values as the V-channel data, and encode the transparency input values based on a V-channel data encoding manner in the video encoder, where Y-channel data and U-channel data that are input to the video encoder are a preset constant.

In an embodiment, the apparatus may further include: a processing module 1104, configured to process the color data and the transparency data of the picture; use the color data as a frame of data of the picture, so as to be encoded by using the video encoder; and use the transparency data as another frame of data of the picture, so as to be encoded by using the video encoder.

In an embodiment, the apparatus may further include: an encapsulation module 1105, configured to generate picture header information data of the picture, where the picture header information data includes basic feature information of one or more image frames in the picture.

In an embodiment, the picture header information data includes: an image sequence header and image feature information data; and the image sequence header is used to identify a type of the picture, and image feature information includes information used to indicate whether the picture includes the transparency data.

For specific implementation of modules in the apparatus according to some embodiments of this application, refer to description of corresponding content in the foregoing embodiments. Details are not described herein.

In some embodiments of this application, when the transparency data of the picture is encoded, data about a picture transparency is encoded as data passing through the corresponding encoding channel of the video encoder, so as to save traffic bandwidth and storage costs of the picture carrying the Alpha channel to a particular extent, improve picture compression efficiency, and save encoding time.

Figure 13:
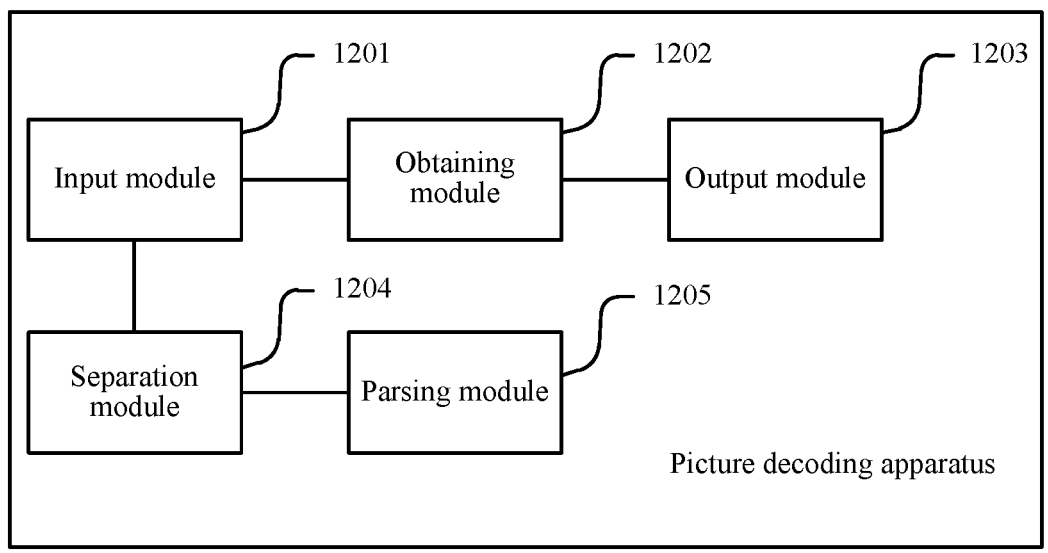
FIG. 13 is a schematic structural diagram of a picture processing apparatus according to an embodiment of this application.

FIG. 13 is a schematic structural diagram of another picture processing apparatus according to an embodiment of this application. The apparatus according to some embodiments of this application is a picture decoding apparatus, and may be set in various intelligent terminals. The intelligent terminal may be a terminal that can process image data such as a picture or a video, such as a smartphone, a tablet computer, or an intelligent wearable device. The apparatus may alternatively be set in a server. The apparatus according to some embodiments of this application includes the following modules.

An input module 1201 is configured to obtain transparency stream data in compressed image data of a picture. An obtaining module 1202 is configured to decode the transparency stream data as target channel data of a video decoder, to obtain transparency output value, and obtain the transparency data of the picture according to the transparency output value. An output module 1203 is configured to output the transparency data, where data of the picture is obtained after the transparency data and the color data of the picture are combined, and the color data of the picture is data obtained after the video decoder decodes the color stream data in the compressed image data.

In an embodiment, the transparency data of the picture is binary data, and the obtaining module 1202 is configured to decode the transparency stream data as the data of the target channel of the video decoder; and learn, if an output value obtained after decoding is greater than a preset threshold, that a value indicated by the transparency data of the picture after decoding is 1; or learn, if an output value obtained after decoding is not greater than a preset threshold, that a value indicated by the transparency data of the picture after decoding is 0.

In an embodiment, the apparatus may further include: a separation module 1204, configured to process the compressed image data of the picture, to obtain a frame of transparency stream data and a frame of color stream data in the compressed image data.

In an embodiment, the apparatus may further include: a parsing module 1205, configured to parse picture header information data in the compressed image data of the picture; and notify the separation module 1204 when the picture header information data is obtained through the parsing.

In an embodiment, the parsing module 1205 is specifically configured to notify, after the picture header information data is obtained through the parsing, the separation module 1204 when it is determined that the picture header information data indicates that the picture is a picture including the transparency data.

In an embodiment, the picture header information data includes: an image sequence header and image feature information data; and the image sequence header is used to identify a type of the picture, and image feature information includes information used to indicate whether the picture includes the transparency data.

For specific implementation of modules in the apparatus according to some embodiments of this application, refer to description of corresponding content in the foregoing embodiments. Details are not described herein.

In some embodiments of this application, when the transparency data of the picture is decoded, data about a picture transparency is decoded as data passing through the corresponding decoding channel of the video decoder, so as to save traffic bandwidth and storage costs of the picture carrying the Alpha channel to a particular extent, improve picture compression efficiency, and save decoding time.

Figure 14:
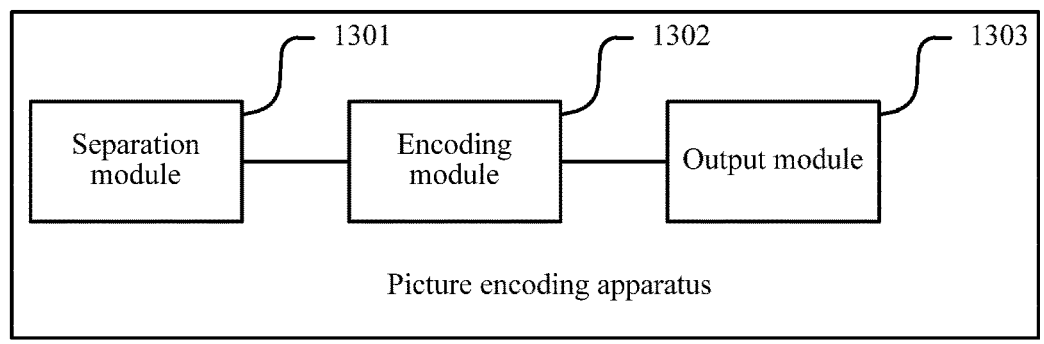
FIG. 14 is a schematic structural diagram of a picture processing apparatus according to an embodiment of this application.

FIG. 14 shows still another picture processing apparatus according to an embodiment of this application. The apparatus according to some embodiments of this application is a picture decoding apparatus, and may be set in various intelligent terminals. The intelligent terminal may be a terminal that can process image data such as a picture or a video, such as a smartphone, a tablet computer, or an intelligent wearable device. The apparatus may alternatively be set in a server. The apparatus according to some embodiments of this application includes the following modules.

A separation module 1301 is configured to obtain transparency data of a picture from the picture. An encoding module 1302 is configured to invoke a video encoder to encode the transparency data, to obtain transparency stream data. An output module 1303 is configured to output the transparency stream data.

In an embodiment, the encoding module 1302 is configured to use the transparency data as data of a target channel of the video encoder, so as to invoke the video encoder to encode the transparency data, where the target channel includes any one of three channels of the video encoder.

In an embodiment, the transparency data is binary data. The encoding module 1302 is configured to select and convert, if a value indicated by the transparency data of the picture is 1, the transparency data into the preset first input value, and use the first input value as target channel data of the video encoder, so as to invoke the video encoder to encode the transparency data; or select and convert, if a value indicated by the transparency data of the picture is 0, the transparency data into the preset second input value, and use the second input value as target channel data of the video encoder, so as to invoke the video encoder to encode the transparency data, where the first input value is different from the second input value.

For specific implementation of modules in the apparatus according to some embodiments of this application, refer to description of related content in the embodiments corresponding to the foregoing accompanying drawings.

In some embodiments of this application, when the transparency data of the picture is encoded, data about a picture transparency is encoded as data passing through the corresponding encoding channel of the video encoder, so as to save traffic bandwidth and storage costs of the picture carrying the Alpha channel to a particular extent, improve picture compression efficiency, and save encoding time.

Figure 15:
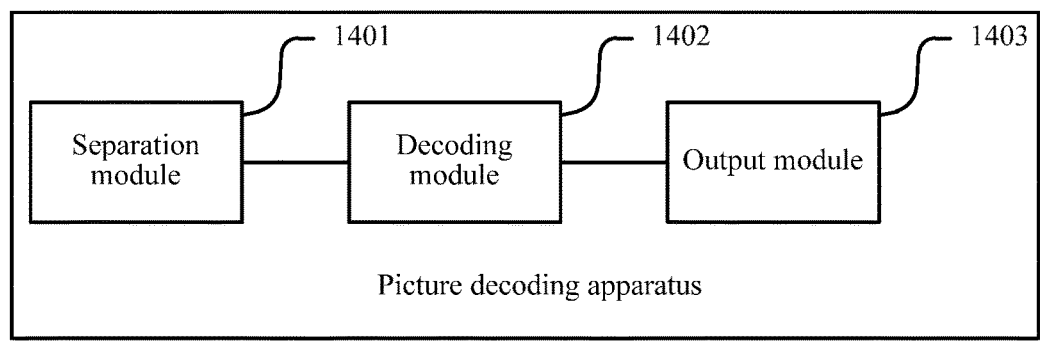
FIG. 15 is a schematic structural diagram of a picture processing apparatus according to an embodiment of this application.

FIG. 15 shows yet another picture processing apparatus according to an embodiment of this application. The apparatus according to some embodiments of this application is a picture decoding apparatus, and may be set in various intelligent terminals. The intelligent terminal may be a terminal that can process image data such as a picture or a video, such as a smartphone, a tablet computer, or an intelligent wearable device. The apparatus may alternatively be set in a server. The apparatus according to some embodiments of this application includes the following modules.

A separation module 1401 is configured to obtain transparency stream data of a picture from compressed image data of the picture. A decoding module 1402 is configured to invoke a video decoder to decode the transparency stream data, to obtain transparency data of the picture. An output module 1403 is configured to output the transparency data.

In an embodiment, the decoding module 1402 is configured to use the transparency stream data as data of a target channel of the video decoder, so as to invoke the video decoder to decode the transparency data, where the target channel includes any one of three channels of the video decoder.

In an embodiment, the transparency data of the picture is binary data, and the decoding module 1402 is configured to decode the transparency stream data as the data of the target channel of the video decoder; and learn, if an output value obtained after decoding is greater than a preset threshold, that a value indicated by the transparency data of the picture after decoding is 1; or learn, if an output value obtained after decoding is not greater than a preset threshold, that a value indicated by the transparency data of the picture after decoding is 0.

For specific implementation of modules in the apparatus according to some embodiments of this application, refer to description of related content in the embodiments corresponding to the foregoing accompanying drawings.

In some embodiments of this application, when the transparency data of the picture is decoded, data about a picture transparency is decoded as data passing through the corresponding decoding channel of the video decoder, so as to save traffic bandwidth and storage costs of the picture carrying the Alpha channel to a particular extent, improve picture compression efficiency, and save decoding time.

Figure 16:
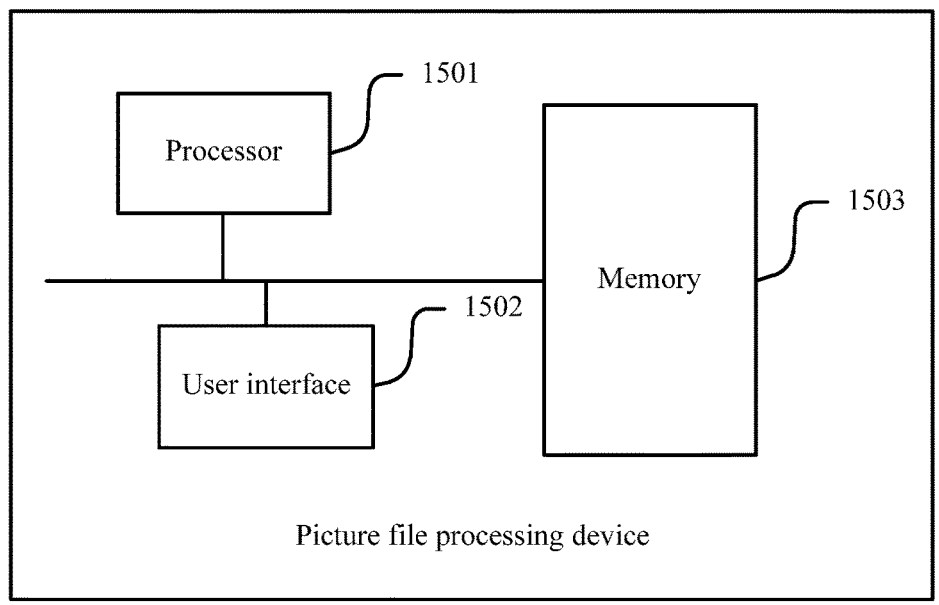
FIG. 16 is a schematic structural diagram of an intelligent terminal according to an embodiment of this application.

FIG. 16 is a schematic structural diagram of an intelligent terminal according to an embodiment of this application. The intelligent terminal according to some embodiments of this application may be set in various intelligent terminals. The intelligent terminal may be a terminal that can process image data such as a picture or a video, such as a smartphone, a tablet computer, or an intelligent wearable device. The intelligent terminal includes a power supply module, and various structures such as a casing and a hardware member, and the intelligent terminal further includes: a processor 1501, a memory 1503 and a user interface 1502.

The user interface 1502 may include a touchscreen, a physical key and the like, can present an image such as a picture to a user, and can further receive an operation instruction of the user for an image such as a picture, for example, a storage instruction for the picture.

The memory 1503 may include a volatile memory such as a random-access memory (RAM); the memory 1503 may also include a non-volatile memory such as a flash memory, a hard disk drive (HDD) or a solid-state drive (SSD); and the memory 1503 may further include a combination of the foregoing types of memories.

The processor 1501 may be central processing unit (CPU). The processor 1501 may further include a hardware chip. The foregoing hardware chip may be an application-specific integrated circuit (ASIC), a programmable logic device (PLD) or a combination thereof. The foregoing PLD may be a complex programmable logic device (CPLD), a field-programmable gate array (FPGA), a generic array logic (GAL) or any combination thereof.

The memory 1503 stores an operating system, and is further configured to store program instructions. The processor 1501 may invoke the program instructions such as computer readable instructions, so as to implement steps in the picture file processing method in this application, and further implement functions of modules in the foregoing terminal in this application, for example, implement steps in FIG. 2 to FIG. 4, and FIG. 6 to FIG. 11 in this application, and further implement functions that apparatuses in FIG. 12 to FIG. 15 in this application need to implement.

In some embodiments of the present disclosure, the processor 1501 invokes the program instructions stored in the memory 1503, and is specifically configured to select transparency input values when transparency data of a picture is encoded; encode the transparency input values as target channel data of a video encoder, to obtain transparency stream data; and output the transparency stream data, compressed image data of the picture including the transparency stream data and color stream data of the picture, and the color stream data being data obtained after the video encoder encodes color data of the picture.

In an embodiment, when being configured to select the transparency input value, the processor 1501 is configured to select the transparency input values of the transparency data as a preset first input value if a value indicated by the transparency data of the picture is 1; or select the transparency input values of the transparency data as a preset second input value if a value indicated by the transparency data of the picture is 0, where the first input value is different from the second input value.

In an embodiment, when being configured to select the transparency input value, the processor 1501 is configured to determine whether the transparency data of the picture is binary data; and further determine, if the transparency data of the picture is binary data, whether the value indicated by the transparency data of the picture is 1 in the binary data or 0 in the binary data.

In an embodiment, input data of the video encoder includes: Y-channel data, U-channel data and V-channel data; and when being configured to encode the selected transparency input value as the data of the target channel of the video encoder, the processor 1501 is specifically configured to use the selected transparency input value as the Y-channel data, and encode the transparency input values based on a Y-channel data encoding manner in the video encoder, where U-channel data and V-channel data that are input to the video encoder are a preset constant.

In an embodiment, input data of the video encoder includes: Y-channel data, U-channel data and V-channel data; and when being configured to encode the selected transparency input value as the data of the target channel of the video encoder, the processor 1501 is specifically configured to use the selected transparency input value as the U-channel data, and encode the transparency input values based on a U-channel data encoding manner in the video encoder, where Y-channel data and V-channel data that are input to the video encoder are a preset constant.

In an embodiment, input data of the video encoder includes: Y-channel data, U-channel data and V-channel data; and when being configured to encode the selected transparency input value as the data of the target channel of the video encoder, the processor 1501 is specifically configured to use the selected transparency input value as the V-channel data, and encode the transparency input values based on a V-channel data encoding manner in the video encoder, where Y-channel data and U-channel data that are input to the video encoder are a preset constant.

In an embodiment, before being configured to select the transparency input value, the processor 1501 is further configured to process the color data and the transparency data of the picture; determine the color data as a frame of data of the picture, so as to be encoded by using the video encoder; and determine the transparency data as another frame of data of the picture, so as to be encoded by using the video encoder.

In an embodiment, the processor 1501 is further configured to generate picture header information data of the picture, where the picture header information data includes basic feature information of one or more image frames in the picture.

In an embodiment, the picture header information data includes: an image sequence header and image feature information data; and the image sequence header is used to identify a type of the picture, and image feature information includes information used to indicate whether the picture includes the transparency data.

For specific implementation of the processor 1501 of the intelligent terminal according to some embodiments of the present disclosure, refer to description of corresponding content in the foregoing embodiments. Details are not described herein.

In another feasible implementation of the present disclosure, the intelligent terminal may further decode the compressed image data of the picture. For a structure of the intelligent terminal in some embodiments, likewise refer to FIG. 16. In some embodiments of the present disclosure, the processor 1501 invokes a program stored in the memory 1503, to perform a picture file processing method in embodiments corresponding to FIG. 8 and FIG. 9. The intelligent terminal in some embodiments of the present disclosure may alternatively include only a function for decoding the picture carrying the transparency data.

In some embodiments of the present disclosure, the processor 1501 invokes the program instructions stored in the memory 1503, and is configured to obtain transparency stream data in compressed image data of a picture; decode the transparency stream data as data of a target channel of a video decoder, to obtain transparency output value, and obtain the transparency data of the picture according to the transparency output value; and output the transparency data, where data of the picture is obtained after the transparency data and the color data of the picture are combined, and the color data of the picture is data obtained after the video decoder decodes the color stream data in the compressed image data.

In an embodiment, the transparency data of the picture is binary data, and when being configured to decode the transparency stream data as data of a target channel of the video decoder, to obtain the transparency data of the picture, the processor 1501 is specifically configured to decode the transparency stream data as data of a target channel of the video decoder; and learn, if an output value obtained after decoding is greater than a preset threshold, that a value indicated by the transparency data of the picture after decoding is 1; or learn, if an output value obtained after decoding is not greater than a preset threshold, that a value indicated by the transparency data of the picture after decoding is 0.

In an embodiment, before being configured to input the transparency stream data in the compressed image data of the picture to the video decoder, the processor 1501 is further configured to process the compressed image data of the picture, to obtain a frame of transparency stream data and a frame of color stream data in the compressed image data.

In an embodiment, the processor 1501 is further configured to parse picture header information data in compressed image data of a picture; and process the compressed image data of the picture if the picture header information data is obtained through the parsing, to obtain the transparency stream data in the compressed image data.

In an embodiment, the picture header information data includes: an image sequence header and image feature information data; and the image sequence header is used to identify a type of the picture, and image feature information includes information used to indicate whether the picture includes the transparency data.

For specific implementation of the processor 1501 of the intelligent terminal according to some embodiments of this application, refer to description of corresponding content in the foregoing embodiments. Details are not described herein.

In some embodiments of this application, when the transparency data of the picture is encoded/decoded, data about a picture transparency is encoded/decoded as data passing through the corresponding encoding/decoding channel of the video encoder or the video decoder, so as to save traffic bandwidth and storage costs of the picture carrying the Alpha channel to a particular extent, improve picture compression efficiency, and save encoding/decoding time.

In still another feasible implementation of this application, the intelligent terminal may further encode the transparency data of the picture. For a structure of the intelligent terminal in some embodiments, likewise, refer to FIG. 16. In some embodiments of this application, the processor 1501 invokes a program stored in the memory 1503, to perform the picture file processing method corresponding to FIG. 10. The intelligent terminal in some embodiments of this application may alternatively include only a function for encoding the transparency data of the picture.

In some embodiments of this application, the processor 1501 invokes the program instructions stored in the memory 1503, and is configured to obtain transparency data of a picture from the picture; invoke a video encoder to encode the transparency data, to obtain transparency stream data; and output the transparency stream data.

In an embodiment, the processor 1501 may use the transparency data as data of a target channel of the video encoder, so as to invoke the video encoder to encode the transparency data, where the target channel includes any one of three channels of the video encoder.

In an embodiment, the transparency data is binary data, and the processor 1501 may be further configured to select and convert, if a value indicated by the transparency data of the picture is 1, the transparency data into the preset first input value, and use the first input value as data of a target channel of the video encoder, so as to invoke the video encoder to encode the transparency data; or select and convert, if a value indicated by the transparency data of the picture is 0, the transparency data into the preset second input value, and use the second input value as data of a target channel of the video encoder, so as to invoke the video encoder to encode the transparency data, where the first input value is different from the second input value.

In some embodiments of this application, when the transparency data of the picture is encoded, data about a picture transparency is encoded as data passing through the corresponding encoding channel of the video encoder, so as to save traffic bandwidth and storage costs of the picture carrying the Alpha channel to a particular extent, improve picture compression efficiency, and save encoding time.

In still another feasible implementation of this application, the intelligent terminal may further decode the transparency stream data in the compressed image data of the picture. For a structure of the intelligent terminal in some embodiments, likewise, refer to FIG. 16. In some embodiments of this application, the processor 1501 invokes a program stored in the memory 1503, to perform the picture file processing method corresponding to FIG. 11. The intelligent terminal in some embodiments of this application may alternatively include only a function for decoding the transparency stream data in the compressed image data of the picture.

In some embodiments of this application, the processor 1501 invokes the program instructions stored in the memory 1503, and is configured to obtain transparency stream data of a picture from compressed image data of the picture; invoke a video decoder to decode the transparency stream data, to obtain transparency data of the picture; and output the transparency data.

In an embodiment, the processor 1501 may use the transparency stream data as data of a target channel of the video decoder, so as to invoke the video decoder to decode the transparency data, where the target channel includes any one of three channels of the video decoder.

In an embodiment, the transparency data of the picture is binary data, and when being configured to invoke a video decoder to decode the transparency stream data, to obtain transparency data of the picture, the processor 1501 is configured to decode the transparency stream data as data of a target channel of the video decoder; and learn, if an output value obtained after decoding is greater than a preset threshold, that a value indicated by the transparency data of the picture after decoding is 1; or learn, if an output value obtained after decoding is not greater than a preset threshold, that a value indicated by the transparency data of the picture after decoding is 0.

In some embodiments of this application, when the transparency data of the picture is decoded, data about a picture transparency may be decoded as data passing through the corresponding decoding channel of the video decoder, so as to save traffic bandwidth and storage costs of the picture carrying the Alpha channel to a particular extent, improve picture compression efficiency, and save decoding time.

Only some embodiments of this application are described above, and are not intended to limit this application. Any modifications, equivalent variations, and improvements made in accordance with the spirits and principles of this application shall fall within the protection scope of this application.

What is claimed is:

1. A picture file processing method, comprising:
   parsing a picture to obtain color data and transparency data of the picture;
   determining, by a computing device, transparency input values according to the transparency data of the picture;
   encoding, by an encoder including a Y channel, a U channel, and a V channel, the transparency input values as data of the Y channel, to obtain transparency stream data of the picture as a first frame of stream data, while having a preset constant inputted to the U channel and the V channel;
   encoding, by the encoder, color data of the picture, to obtain color stream data of the picture, wherein the encoding the color data of the picture includes:
   converting the color data to YUV data; and
   encoding the YUV data via the Y channel, the U channel, and the V channel to obtain a second frame of stream data; and
   outputting, by the computing device, compressed image data of the picture, the compressed image data including the first and the second frames of stream data of the picture.

2. The method according to claim 1, wherein the transparency data comprises transparencies of pixels in the picture, and the determining transparency input values according to the transparency data of the picture comprises:
   determining, when a value indicated by a transparency of a pixel in the transparency data of the picture is 1, that a transparency input value corresponding to the pixel is a preset first input value; and
   determining, when a value indicated by a transparency of a pixel in the transparency data of the picture is 0, that a transparency input value of the pixel is a preset second input value, wherein the preset first input value is different from the preset second input value.

3. The method according to claim 2, wherein before determining the transparency input values according to the transparency data of the picture, the method further comprises:
   determining whether the transparency data of the picture is binary data.

4. The method according to claim 1, wherein before determining the transparency input values according to the transparency data of the picture, the method further comprises:
   obtaining image data of the picture; and
   determining the transparency data of the picture according to the image data.

5. The method according to claim 4, wherein the method further comprises:
   determining the color data of the picture according to the image data, and determining the color data as image frame data of the picture to be input to and encoded by the computing device, to obtain the color stream data.

6. The method according to claim 1, further comprising:
   generating picture header information data of the picture according to the color stream data and the transparency stream data; and
   including the picture header information in the compressed image data.

7. The method according to claim 6, wherein the picture header information data comprises: an image sequence header and image feature information data; and the image sequence header is used to identify a type of the picture, and the image feature information data comprises information indicating whether the picture comprises the transparency data.

8. A picture file processing device, comprising one or more processors and one or more memories, the one or more processors being configured to:
   parse a picture to obtain color data and transparency data of the picture;
   determine transparency input values according to the transparency data of the picture;

encode, using a video encoder including a Y channel, a U channel, and a V channel, the transparency input values as data of the Y channel of the video encoder, to obtain transparency stream data of the picture as a first frame of stream data, while having a preset constant inputted to the U channel and the V channel;

encode, using the video encoder, color data of the picture, to obtain color stream data of the picture, wherein the step to encode includes:
 converting the color data to YUV data; and
 encoding the YUV data via the Y channel, the U channel, and the V channel to obtain a second frame of stream data; and output compressed image data of the picture, the compressed image data including the first and the second frames of stream data of the picture.

9. The device according to claim 8, wherein the transparency data comprises transparencies of pixels in the picture, wherein the processor is further configured to:
 determine, when a value indicated by a transparency of a pixel in the transparency data of the picture is 1, that a transparency input value corresponding to the pixel is a preset first input value; and
 determine, when a value indicated by a transparency of a pixel in the transparency data of the picture is 0, that a transparency input value of the pixel is a preset second input value, wherein the preset first input value is different from the preset second input value.

10. The device according to claim 9, wherein before determining the transparency input values according to the transparency data of the picture, the processor is further configured to:
 determine whether the transparency data of the picture is binary data.

11. The device according to claim 8, wherein before determining the transparency input values according to the transparency data of the picture, the processor is further configured to:
 obtain image data of the picture; and
 determine the transparency data of the picture according to the image data.

12. The device according to claim 11, wherein the processor is further configured to:
 determine the color data of the picture according to the image data, and determine the color data as image frame data of the picture to be input to and encoded by the video encoder, to obtain the color stream data.

13. The device according to claim 8, wherein the processor is further configured to:
 generate picture header information data of the picture according to the color stream data and the transparency stream data; and
 include the picture header information in the compressed image data.

14. A non-transitory computer readable storage medium, storing computer readable instructions, to cause at least one processor to perform:
 parsing a picture to obtain color data and transparency data of the picture;
 determining transparency input values according to the transparency data of the picture;
 encoding, using a video encoder including a Y channel, a U channel, and a V channel, the transparency input values as data of the Y channel of the video encoder, to obtain transparency stream data of the picture as a first frame of stream data, while having a preset constant inputted to the U channel and the V channel;
 encoding, using the video encoder, color data of the picture, to obtain color stream data of the picture, wherein the encoding the color data of the picture includes:
  converting the color data to YUV data; and
  encoding the YUV data via the Y channel, the U channel, and the V channel to obtain a second frame of stream data; and
 outputting compressed image data of the picture, the compressed image data including the first and the second frames of stream data of the picture.

15. The method according to claim 1, further comprising:
 determining the transparency data is binary data of value 0 and value 1; and
 normalizing value 1 to a maximum gray scale value and normalizing value 0 to a minimum grayscale value.

16. The method according to claim 1, wherein the picture, prior to parsing, is of a format of jpeg/png.

17. The method according to claim 1, further comprising:
 decoding the first frame of stream data to obtain a first frame of YUV data, discarding U-channel data and V-channel data but keeping Y-channel data of the first frame of YUV data;
 decoding the second frame of stream data to obtain a second frame of YUV data and converting the second frame of YUV data to obtain RGB data; and
 combining the Y-channel data of the first frame of YUV data and the RGB data to obtain RGBA data.

18. The method according to claim 1, wherein encoding the transparency input values to obtain transparency stream data comprises:
 in response to determining the transparency input values are not binary, directly assigning the transparency input values to the Y channel; and
 in response to determining the transparency input values are binary and being between 0 and 1, respectively assigning a grayscale value between 0 and 255 to the Y channel.

* * * * *